United States Patent
Shin et al.

(10) Patent No.: US 7,596,133 B2
(45) Date of Patent: Sep. 29, 2009

(54) APPARATUS AND METHOD FOR DATA TRANSMISSION/RECEPTION USING CHANNEL STATE INFORMATION IN WIRELESS COMMUNICATION SYSTEM

(75) Inventors: Yo-An Shin, Seoul (KR); Jong-Won Kim, Seoul (KR)

(73) Assignees: Samsung Electronics Co., Ltd (KR); Seoul National University Industry Foundation (KR)

( * ) Notice: Subject to any disclaimer, the term of this patent is extended or adjusted under 35 U.S.C. 154(b) by 732 days.

(21) Appl. No.: 11/128,925

(22) Filed: May 12, 2005

(65) Prior Publication Data

US 2005/0254461 A1 Nov. 17, 2005

(30) Foreign Application Priority Data

May 12, 2004 (KR) ........................ 10-2004-0033451

(51) Int. Cl.
- H04L 12/50 (2006.01)
- H04Q 11/00 (2006.01)
- H04W 4/00 (2009.01)
- H04J 11/00 (2006.01)
- H04W 72/00 (2009.01)
- H04B 1/00 (2006.01)

(52) U.S. Cl. ............... 370/366; 370/329; 370/208; 370/334; 455/464; 375/144; 375/149

(58) Field of Classification Search ............ 370/329, 370/208, 334; 455/464; 375/144, 149
See application file for complete search history.

(56) References Cited

U.S. PATENT DOCUMENTS

| | | | | |
|---|---|---|---|---|
| 5,365,553 | A * | 11/1994 | Veldhuis et al. | 375/241 |
| 6,771,706 | B2 | 8/2004 | Ling et al. | |
| 6,785,341 | B2 | 8/2004 | Walton et al. | |
| 6,888,809 | B1 * | 5/2005 | Foschini et al. | 370/334 |
| 7,310,301 | B1 * | 12/2007 | Kleider et al. | 370/203 |
| 7,382,718 | B2 * | 6/2008 | Chang et al. | 370/204 |
| 2001/0012785 | A1 * | 8/2001 | Esteves et al. | 455/522 |
| 2003/0223514 | A1 * | 12/2003 | Pladdy et al. | 375/343 |
| 2004/0141548 | A1 * | 7/2004 | Shattil | 375/146 |
| 2004/0213293 | A1 * | 10/2004 | Basso et al. | 370/480 |
| 2005/0047517 | A1 | 3/2005 | Georgios et al. | |

FOREIGN PATENT DOCUMENTS

KR 1020040058440 7/2004

OTHER PUBLICATIONS

Inhyoung Kim et al., On the Use of Linear Programming for Dynamic Subchannel and Bit Allocation in Multiuser OFDM, 2001.
Cheong Yui Wong et al., Multiuser OFDM with Adaptive Subcarrier, Bit, and Power Allocation, 1999.

* cited by examiner

Primary Examiner—Daniel J Ryman
Assistant Examiner—Andrew Oh
(74) Attorney, Agent, or Firm—The Farrell Law Firm, LLP

(57) ABSTRACT

Disclosed is a method for transmitting and receiving data according to a channel state in a wireless communication system, the method includes measuring a characteristic of transmission channels used for data transmission and transmitting channel state information of the measured channel characteristic; and selecting sub-channels for data transmission according to the channel state information, and transmitting data through the selected sub-channels.

12 Claims, 16 Drawing Sheets

APPARATUS AND METHOD FOR DATA TRANSMISSION/RECEPTION USING CHANNEL STATE INFORMATION IN WIRELESS COMMUNICATION SYSTEM

PRIORITY

This application claims to the benefit under 35 U.S.C. 119(a) of an application entitled "Apparatus And Method For Data Transmission/Reception Using Channel State Information In Wireless Communication System" filed in the Korean Intellectual Property Office on May 12, 2004 and assigned Serial No. 2004-33451, the entire contents of which are incorporated herein by reference.

BACKGROUND OF THE INVENTION

1. Field of the Invention

The present invention relates to an orthogonal frequency division multiplexing (OFDM) system, and more particularly to a method for transmitting data using Vertical-Bell Labs Layered Space-Time (V-BLAST) coding in a multiple-input multiple-output (MIMO) OFDM communication system.

2. Description of the Related Art

Various transmission and reception schemes in a wireless mobile communication system have been proposed to achieve high-quality and high-capacity multimedia data transmission within the limited frequency resources available. Demands for a method that is effective at removing the fading phenomenon occurring in mobile wireless channels are gradually increasing in order to achieve the high-speed transmission of such multimedia data. Extensive research is being conducted in relation to MIMO technology, which uses multiple transmission/reception antennas to be applied to the fourth generation (4G) mobile communication system for very high-speed multimedia data transmission. The MIMO technology is a well-known technology, so a detailed description thereof will be omitted.

The MIMO technology includes a V-BLAST technique developed by Bell Laboratories of Lucent Technologies, USA. According to the V-BLAST technique, a complex coding in a transmission side is not required, and different signals are transmitted from each transmission antenna. Therefore, it is possible to greatly increase the data transmission rate by the V-BLAST technique.

In addition, according to the V-BLAST technique, data streams are independently encoded and are transmitted from different antennas. A reception side performs an ordered successive interference cancellation (OSIC) procedure to remove any interference between signals transmitted from the different transmission antennas. An OFDM technique using multiple carriers to increase the frequency efficiency and to efficiently remove multipath fading may be employed in the V-BLAST system.

The V-BLAST scheme uses an open loop technique, which does not need any information feedback from a reception side to a transmission side. Some schemes to feedback necessary information from a reception side to a reception side for performance improvement have been proposed. For instance, an Adaptive Bit and Power Allocation (ABPA) scheme is a representative example. According to the ABPA, a reception side of the MIMO system using a V-BLST detector on the basis of a two-dimensional water pouring principle determines various modulation schemes (i.e. the number of bits and power to be allocated) for each of sub-channels according to a channel state, and feedbacks the determined modulation scheme to a transmission side.

The ABPA scheme provides an optimum performance with respect to the bit error rate (BER). However, the ABPA scheme is disadvantageous in that the feedback information from the reception side to the transmission side is excessively required and thus a large number of operations is required for bit and power allocation. Therefore, in an actual operating environment considering feedback delay, etc., the ABPA scheme may exhibit much lower performance than expected in theory.

In order to compensate for the problems of the ABPA scheme, a Simplified Bit Allocation (SBA) scheme for allocating an equal number of bits to partial sub-channels having an excellent channel characteristic has been proposed to reduce the amount of operation required to allocate bits and the amount of feedback information from a reception side to a transmission side. Particularly, according to the SBA scheme, an equal modulation scheme is applied only to selected sub-channels, and no bits are allocated to unselected sub-channels.

The SBA scheme also has a problem in that an overall transmission rate is reduced due to the sub-channels to which no bits have not been allocated. In order to prevent such a problem in the SBA scheme, a higher-level modulation technique other than the original one must be used for the selected sub-channels. When the higher-level modulation technique is applied to selected sub-channels as described above, there is a problem in that the probability of symbol error on the selected channel increases.

Since a typical V-BLAST detection technique as described above performs a hard decision in an interference removing procedure, it has a problem in that the gain of a channel code for performing the soft channel decoding decreases. Since an input value to a channel decoder in an OSIC procedure is a hard decision value as described above, there is a problem in that a channel code gain of a soft decoder decrease such as that of a zigzag decoder.

As described above, when information can be feedback from a reception side to a transmission side in a MIMO-OFDM system, various schemes for improving the performance of a typical V-BLAST algorithm may be considered.

For example, as described above, the ABPA scheme may be considered as representative. According to the ABPA scheme, a reception side determines various modulation schemes (i.e. the number of bits and power to be allocated) for each sub-channel according to a channel state on the basis of a two-dimensional water pouring principle, and feedbacks to a transmission side the determined modulation scheme. The ABPA scheme performs optimally in view of the bit error rate performance, but has difficulty in finding an optimum V-BLAST detection sequence because each sub-channel has a different signal constellation. This is because such a V-BLAST detection sequence becomes ineffective when signal constellations used with antennas differ. According to the ABPA scheme, as the number of transmission antennas increases, the amount of operation for bit and power allocation and feedback information from a reception side to a transmission side increases more rapidly.

As a scheme for reducing the number of operations for bit allocation and feedback information from a reception side to a transmission side, the Simplified Bit Allocation (SBA) scheme has been proposed as described above. According to the SBA scheme, a modulation scheme having an equal signal constellation is applied to each sub-channel by allocating an equal number of bits to the sub-channels, thereby significantly reducing the amount of operation for finding an optimum detection sequence and a sub-channel for bit allocation. According to the SBA scheme, an equal number of bits is allocated to each sub-channel, and the transmission side does not need information for power allocation, so that feedback information from the reception side to the transmission side is reduced. However, since the SBA scheme applies an equal modulation scheme only to selected sub-channels but allocates no bit to unselected channels, an overall transmission rate is reduced due to the channels to which no bit has been allocated. In order to prevent such a problem in the SBA scheme, a higher-level modulation technique than the original one must be used for the selected sub-channels. As a result, the SBA scheme has advantages in that it increases the probability of symbol error on sub-channels to which bits have been allocated and it has a much inferior bit error rate performance to the ABPA scheme.

SUMMARY OF THE INVENTION

Accordingly, the present invention has been made to solve at least the above-mentioned problems occurring in the prior art, and an object of the present invention is to provide a method which can minimize the number of operations for bit allocation and the amount of feedback information in a wireless mobile communication system.

Another object of the present invention is to provide a method which can increase the gain of a channel code by removing interference by means of a soft demapper in a wireless mobile communication system.

Still another object of the present invention is to provide a data transmission method in a wireless mobile communication system, in which if a relevant channel is available and is determined based on channel state information (CSI) feedback from a reception side.

To accomplish this object, in accordance with one aspect of the present invention, there is provided a method for transmitting and receiving data according to a channel state in a wireless communication system, the method includes measuring a characteristic of transmission channels used for data transmission and transmitting channel state information of the measured channel characteristic; and selecting sub-channels for data transmission according to the channel state information and transmitting data through the selected sub-channels.

In accordance with another aspect of the present invention, there is provided a method for allocating bits to sub-channels for data transmission in a wireless communication system, the method includes setting the number of bits allocated to all sub-channels to an initial value and calculating the number of sub-channels required for bit allocation; determining an encoding detection sequence for each subcarrier in a state in which the initial value is set, and calculating a weight vector for all subcarriers according to the encoding detection sequence; determining a sub-channel with the least 2-Norm value from among all of the sub-channels by using the calculated weight vector, and selecting the sub-channel as a sub-channel with the lest 2-Norm value for bit allocation; and allocating 'K' bits to all of the selected sub-channels.

In accordance with still another aspect of the present invention, there is provided an apparatus for transmitting and receiving data according to a channel state in a wireless communication system, the apparatus includes a reception apparatus for measuring a characteristic of transmission channels used for data transmission and feedbacking channel state information of the measured channel characteristic; and a transmission apparatus for selecting sub-channels for data transmission according to the channel state information feedback from the reception apparatus and transmitting data through the selected sub-channels.

In accordance with still another aspect of the present invention, there is provided an apparatus for allocating bits to sub-channels for data transmission in a wireless communication system, wherein the apparatus sets the numbers of bits allocated to all sub-channels to an initial value, calculates the number of sub-channels required for bit allocation, determines an encoding detection sequence for each subcarrier in a state in which the initial value is set, calculates a weight vector for all subcarriers according to the determined encoding detection sequence, determines a sub-channel with the least 2-Norm value from among all sub-channels by using the calculated weight vector, selects the sub-channel with the least 2-Norm value as a sub-channel for bit allocation, and allocates 'K' bits to all of the selected sub-channels.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments according to the present invention will be described with reference to the accompanying drawings. In the following description of the embodiments of the present invention, a detailed description of known functions and configurations incorporated herein will be omitted when it may obscure the subject matter of the present invention.

The present invention proposes an Adaptive Coding Bit Allocation (ACBA) technique which ensures a sub-channel for bit allocation by increasing the rate of a channel code and adaptively performs bit allocation, in a manner different from an SBA scheme using an equal modulation scheme of a high level for selected sub-channels, in a V-BLAST MIMO-OFDM system using channel codes of a soft channel decoding scheme. The ACBA technique according to the present invention can greatly improve the bit error rate (BER) performance as compared with the conventional SBA scheme, while maintaining the number of operations and feedback information equal to those of the SBA scheme.

The present invention refers to a closed-loop V-BLAST MIMO-OFDM technique in which an effective bit allocation and soft-decision zigzag codes are associated. Particularly, the method of the present invention reduces the number of bits to be transmitted by controlling a channel code rate, and performs bit allocation by using a modulation scheme equal to that of the typical V-BLAST OFDM technique, which does not utilize a sub-channel having a poor channel characteristic and allocates no bits to that sub-channel. Therefore, the present invention requires the same amounts of feedback information and number of operations as those of the conventional SBA technique, which minimizes the amount of feedback information and the number of operations for bit allocation, but provides superior performance to the conventional SBA technique.

In addition, in a manner different from the conventional V-BLAST detecting technique which cannot sufficiently ensure the gain of a channel code because performing a hard decision in an interference removing procedure, the technique according to the present invention can maximize the gain of a channel code by performing a soft zigzag decoding with a soft demapper connected in the interference removing procedure.

A V-BLAST MIMO-OFDM system including a soft demapper for an ordered successive interference cancellation (OSIC) procedure will be described with reference to FIGS. 1A and 1B, and a soft channel decoding method will be described with reference to the construction of the system.

Figure 1A:
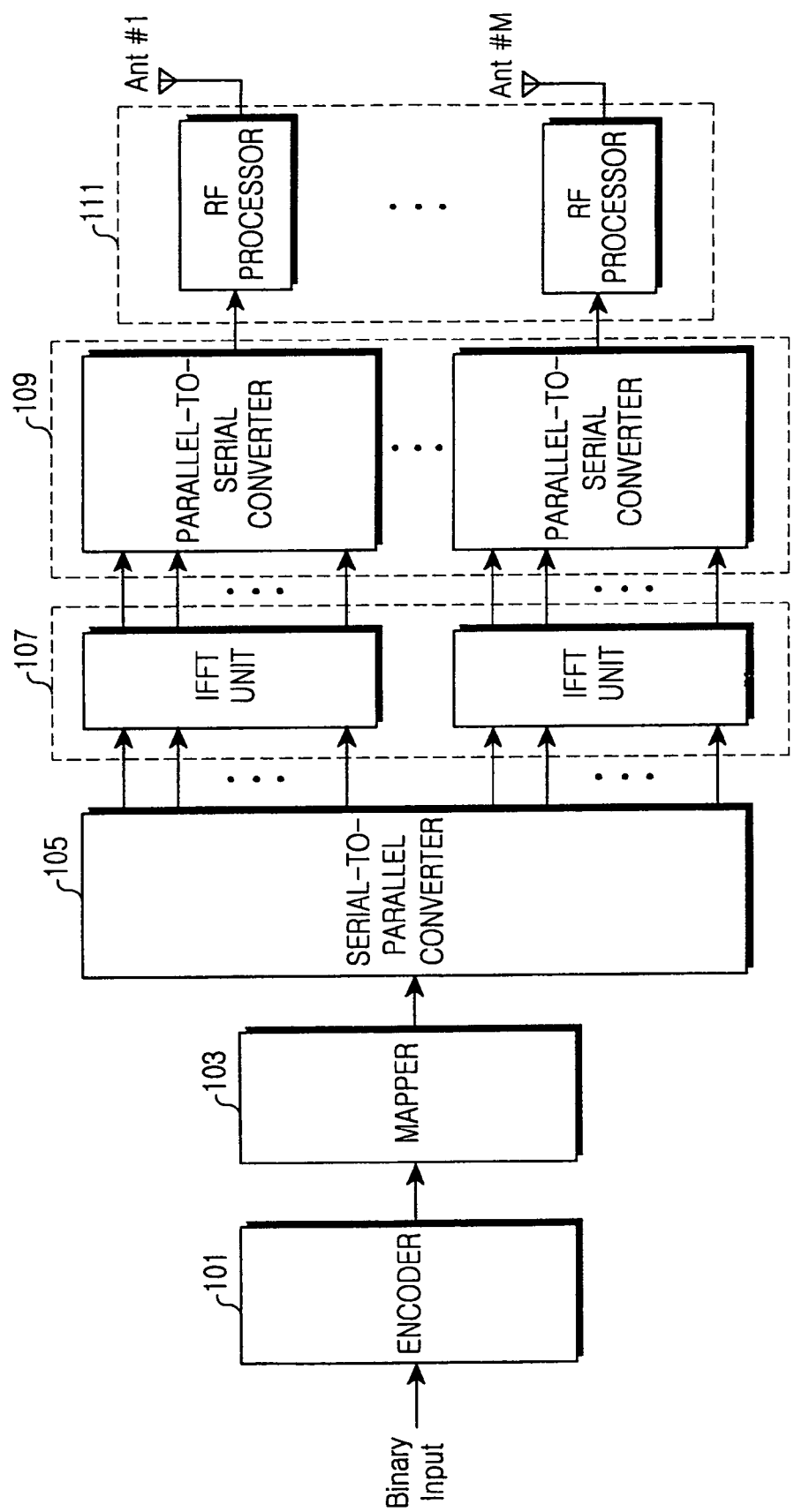
FIG. 1A is a block diagram of a construction of a transmission side in a V-BLAST MIMO-OFDM system to which a channel code and a soft demapper according to an embodiment of the present invention.
Figure 1B:
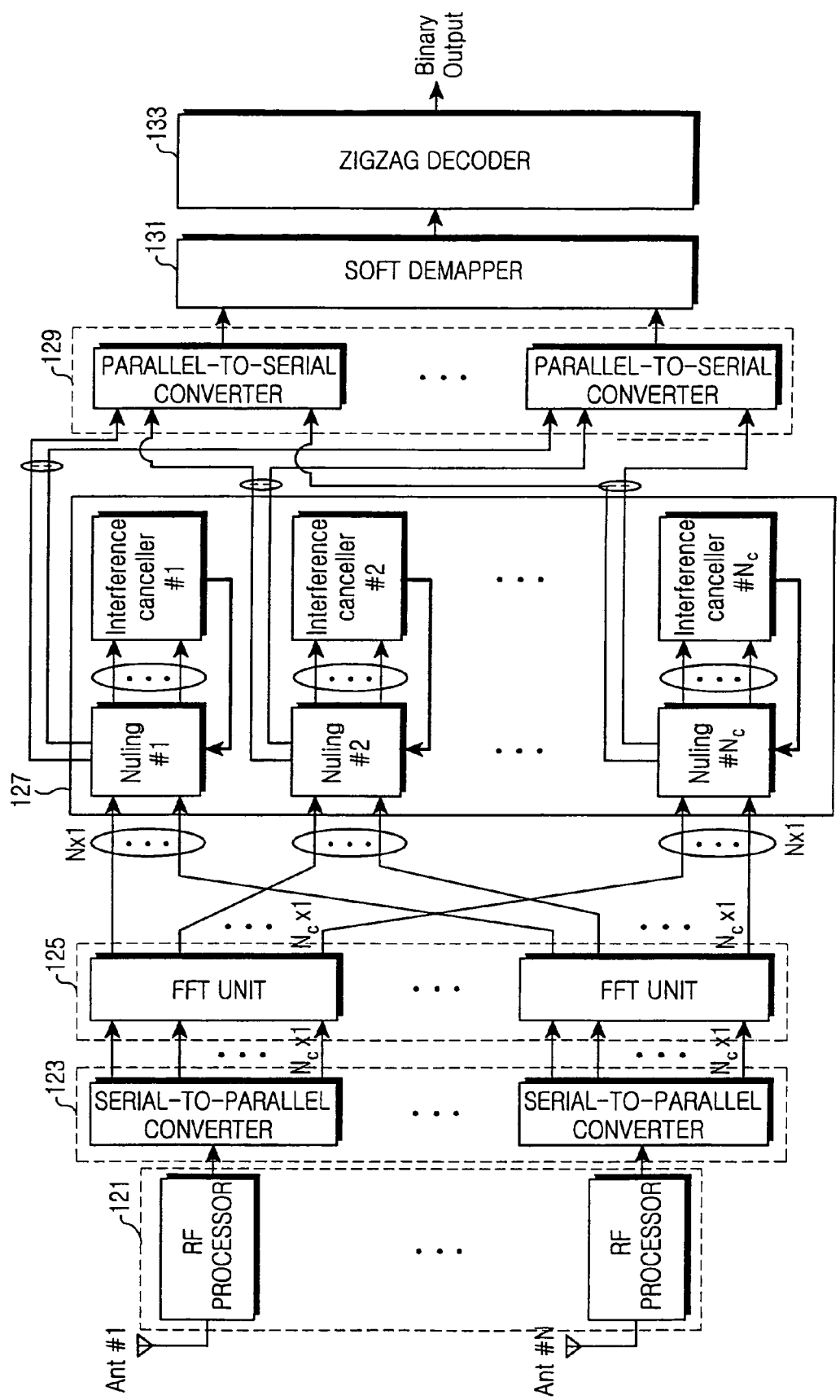
FIG. 1B is a block diagram of a construction of a reception side in a V-BLAST MIMO-OFDM system to which a channel code and a soft demapper according to an embodiment of the present invention.

FIGS. 1A and 1B are block diagrams illustrating the transmission and reception sides of a V-BLAST MIMO-OFDM system to which a channel code and a soft demapper according to an embodiment of the present invention are applied. FIG. 1A illustrates the construction of the transmission side and FIG. 1B illustrates the construction of the reception side.

Referring to FIG. 1A, the transmission side of the V-BLAST MIMO-OFDM system includes an encoder 101, a mapper 103, a serial-to-parallel converter 105, a plurality of inverse fast Fourier transform (IFFT) units 107, a plurality of parallel-to-serial converters 109, a plurality of radio frequency (RF) processors 111, and a plurality of transmission antennas Ant #1 to Ant #M.

Referring to FIG. 1B, the reception side of the V-BLAST MIMO-OFDM system includes a plurality of reception antennas Ant #1 to Ant #N, a plurality of RF processors 121, a plurality of serial-to-parallel converters 123, a plurality of fast Fourier transform (FFT) units 125, an interference removing unit 127, a plurality of parallel-to-serial converters 129, a soft demapper 131, and a zigzag decoder 133.

A V-BLAST detecting method in the system including the soft demapper will now be described with reference to the transmission and reception sides described above.

First, it is assumed in FIGS. 1A and 1B that the MIMO-OFDM system uses M transmission antennas and N reception antenna and each transmission antenna of the transmission side uses $N_c$ carriers.

In addition, it is assumed in the MIMO-OFDM system that a complex fading channel coefficient from a $k^{th}$ transmission antenna to an $l^{th}$ reception antenna for a $c^{th}$ ($c=1, \ldots, N_c$) subcarrier is denoted as $h_{l,k,c}$ ($k=1, \ldots, M; l=1, \ldots, N$), and the value of the coefficient does not change during any one symbol internal. In this case, an instantaneous channel transfer matrix $H_c$ of a $c^{th}$ subcarrier having a size of 'N×M' may be defined as Equation 1.

$$Hc = \begin{bmatrix} h_{1,1,c} & \cdots & h_{1,M,c} \\ \vdots & \ddots & \vdots \\ h_{N,1,c} & \cdots & h_{N,M,c} \end{bmatrix} \quad (1)$$

Also, a transmission signal vector $x_c$ having a size of 'M×1' in the $c^{th}$ subcarrier may be expressed as Equation 2.

$$x_c = [x_{1,c}\, x_{2,c} \ldots x_{M,c}]^T \quad (2)$$

A signal received through a channel, that is, a received signal vector $y_c$ may be expressed as a vector having a size of 'N×1' such as shown in Equation 3.

$$y_c = H_c x_c + n \quad (3)$$

In Equation 3, 'n' represents a noise vector, which is defined as $n \equiv [n_1, \ldots, n_N]^T$.

A procedure for detecting a transmission signal $x_c$ from the received signal $y_c$ shown in Equation 3 will now be described in detail with reference to Equations 4 to 12.

First, an inverse matrix of the channel matrix $H_c$ is defined as Equation 4.

$$Z_c = H_c^+ = (H_c^H H_c)^{-1} H_c^H \quad (4)$$

In equation 4, the superscript '+' represents a Moore-Penrose Generalized Pseudo Inverse matrix. Equation 5 is calculated from the initial inverse matrix $Z_c$ for the $c^{th}$ subcarrier, which has been obtained as shown above.

$$k_1 = \arg\min_j \|(Z_c)_j\|^2 \quad (5)$$

In Equation 5, '$(Z_c)_j$' represents a $j^{th}$ row of the matrix $Z_c$.

An initial setup procedure for signal detection in the reception side is described with Equations 4 and 5. After such an initial setup procedure has been performed, operations shown in Equations 6 to 12 is repeatedly performed.

$$w_{k_i,c} = (Z_{i,c})_{k_i} \quad (6)$$

$$v_{k_i,c} = w_{k_i,c} y_{i,c} \quad (7)$$

$$\bar{x}_{k_i,c} = B(v_{k_i,c}) \quad (8)$$

$$\hat{x}_{k_i,c} = Q(v_{k_i,c}) \quad (9)$$

In Equation 6, 'i' represents $i^{th}$ repetition of the operation, and '$k_i$' (i=1, ..., M) represents a sequence for removal of signal components to detect the transmission symbol $x_c$ in the reception side. In Equation 6, a $k_j^{th}$ row vector of the matrix $Z_c$ is defined as a nulling vector '$w_{k_i,c}$'. Then, as expressed in Equation 7, the received signal $y_{i,c}$ is multiplied by the nulling vector '$w_{k_i,c}$' obtained from Equation 6, thereby obtaining the value of '$v_{c,k}$'.

In Equation 8, 'B(•)' represents a soft demapper operation, by which a soft decision metric detection for soft channel decoding is performed.

After the soft demapping is performed, a $k_j^{th}$ hard-decided signal component of the transmission signal vector $x_c$ for interference removal can be obtained by Equation 9. For additional performance improvement, on the assumption that a $k_j^{th}$ hard-decided signal component of the transmission signal vector $x_c$ is perfectly estimated, a $k_j^{th}$ detected interference signal component from the received signal $y_{i,c}$ in an $i^{th}$ step is removed by Equation 10 below, and an OSIC procedure for determining a received signal vector for an operation of an $(i+1)^{th}$ step is performed.

$$y_{i+1,c} = y_{i,c} - \hat{x}_{k_i,c} H_{c,k_i} \quad (10)$$

$$Z_{i+1} = (H_{c,k_i=0})^+ \quad (11)$$

In Equation 10, '$H_{c,k_i}$' represents a $k_j^{th}$ column vector of the channel matrix $H_c$. In Equation 11, '$H_{c,k_i=0}$' represents that the $k_j^{th}$ column vector component of the channel matrix $H_c$ is nulled by removing the component of the signal previously detected through the operation by Equation 10. In order to detect the remaining interference signal components, a new inverse matrix as expressed in Equation 11 is configured.

Then, with the new inverse matrix obtained from Equation 11, the optimum detection sequence for the next step is determined as expressed in Equation 12.

$$k_{i+1} = \underset{j \neq k_1,...,k_i}{\arg\min} \|(Z_c)_j\|^2 \quad (12)$$

$$i \leftarrow i + 1$$

In Equation 12, the optimum detection sequence for the next step is determined using the new inverse matrix obtained from Equation 11 in the same way as that in Equation 5. Thereafter, original data for channel decoding are detected from the received signal by applying such a procedure to all of the used subcarriers.

A signal-to-noise ratio (SNR) $\rho_{k_i,c}$ for $x_{k_i,c}$ may be expressed as Equation 13.

$$\rho_{k_i,c} = \frac{E[\|x_{k_i,c}\|^2]}{\sigma^2 \|w_{k_i,c}\|^2} \quad (13)$$

Referring to Equation 13, it can be understood that $\rho_{k_i,c}$ is proportional to $\|w_{k_i,c}\|^{-2}$. Therefore, $\|w_{k_i,c}\|^{-2}$ is regarded as a channel gain, and thus a bit allocation algorithm that considers a channel characteristic may be performed using the value of $\|w_{k_i,c}\|^{-2}$.

A V-BLAST MIMO-OFDM system to which an Adaptive Coding Bit Allocation (ACBA) scheme is applied according to an embodiment of the present invention will be described with reference to FIGS. 2A and 2B.

Figure 2A:
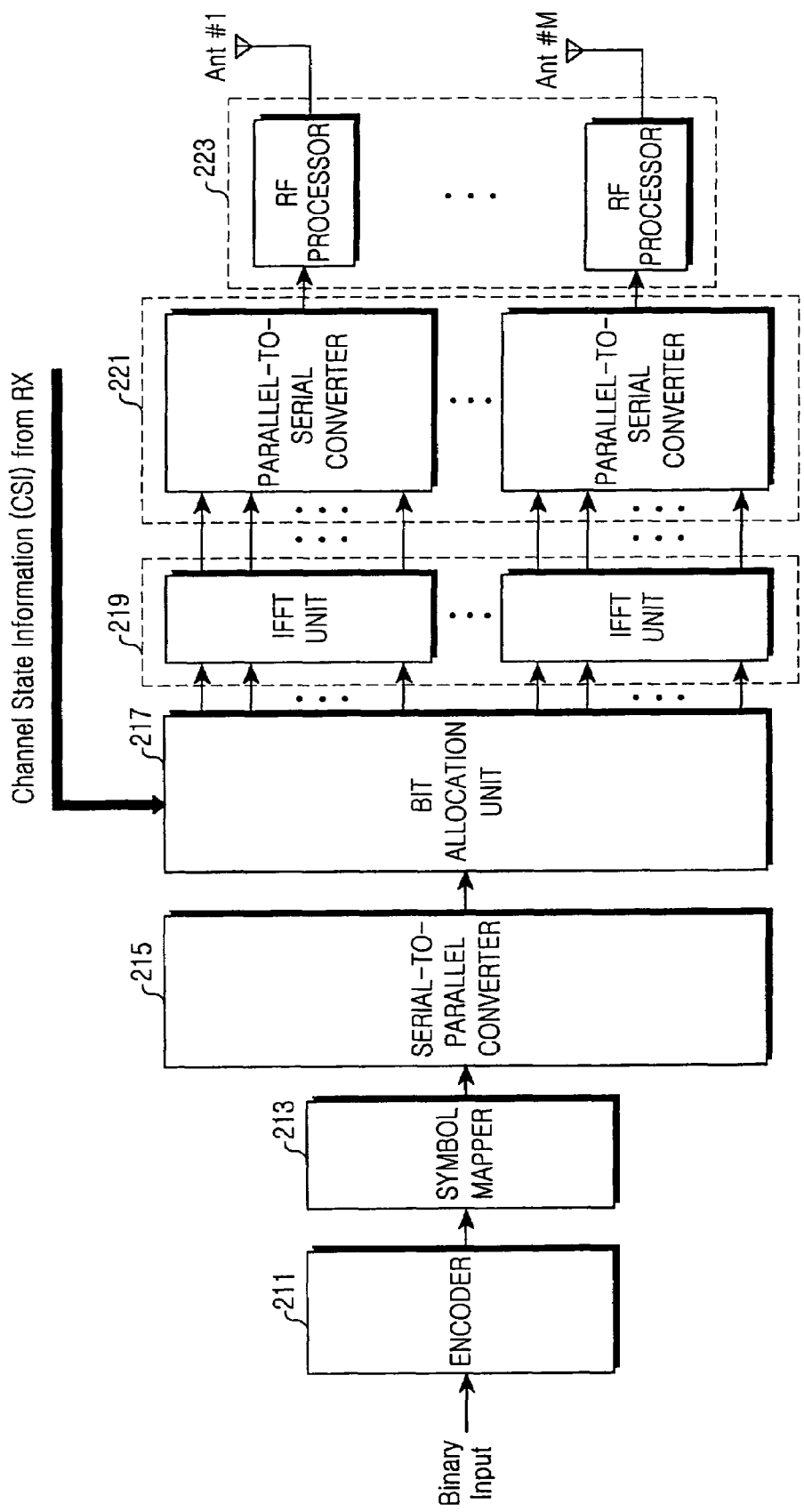
FIG. 2A is a block diagram illustrating a construction of a transmission side in a V-BLAST-detector-based MIMO-OFDM system to which the ACBA scheme is applied according to an embodiment of the present invention.
Figure 2B:
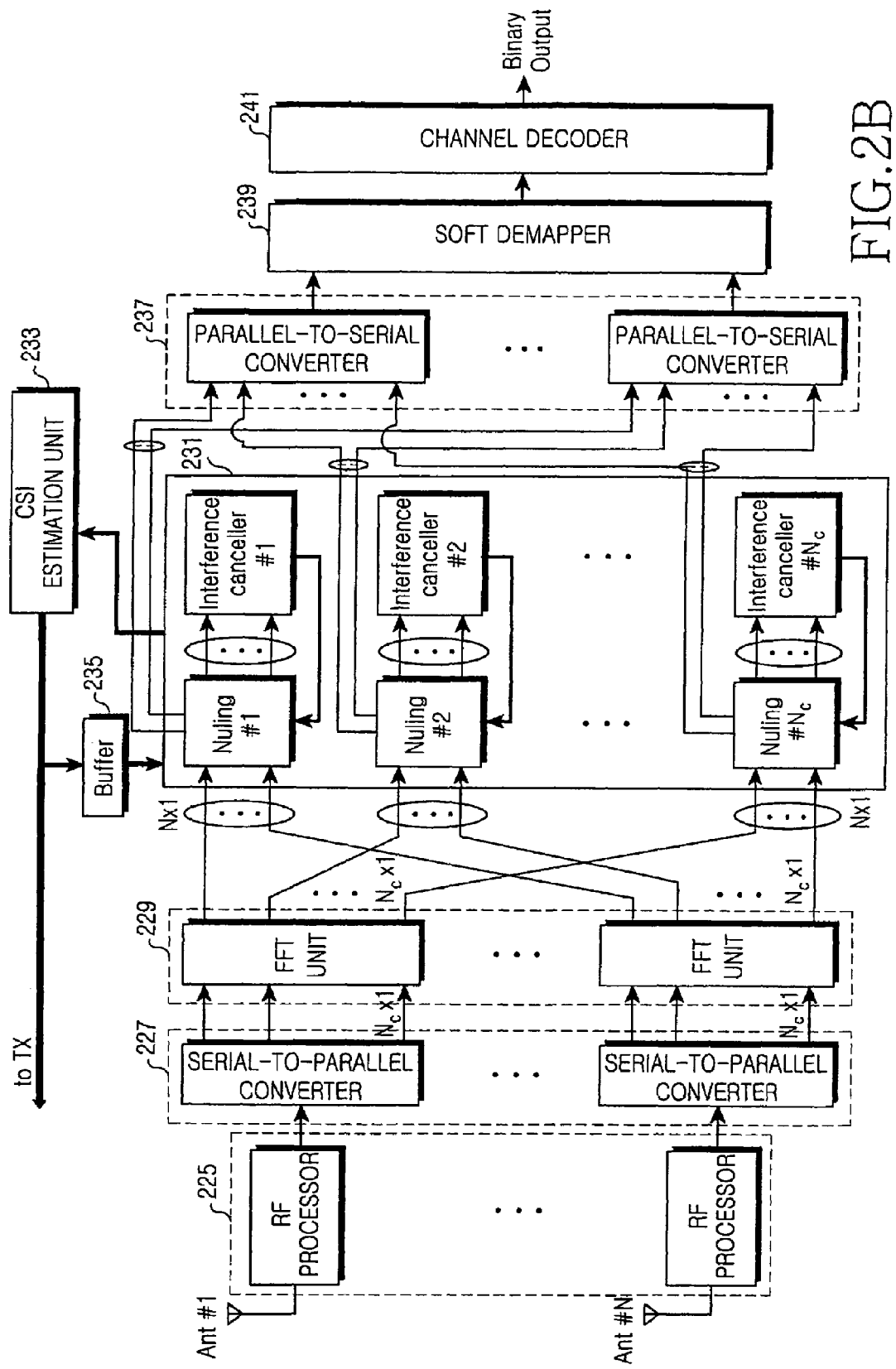
FIG. 2B is a block diagram illustrating a construction of a reception side in a V-BLAST-detector-based MIMO-OFDM system to which the ACBA scheme is applied according to an embodiment of the present invention.

Prior to the description of FIGS. 2A and 2B, as described above, when information can be feedback from a reception side to a transmission side in a MIMO-OFDM system, various schemes for improving the performance of a typical V-BLAST algorithm may be considered.

For example, as described above, the ABPA scheme may be considered as representative. According to the ABPA scheme, a reception side determines the various modulation schemes (i.e. the number of bits and power to be allocated) for each of the sub-channels according to a channel state on the basis of a two-dimensional water pouring principle, and feedbacks the determined modulation scheme to a transmission side. The ABPA scheme performs optimally in view of bit error rate performance, but has difficulty in finding an optimum V-BLAST detection sequence because each sub-channel has a different signal constellation. This is because such a V-BLAST detection sequence becomes ineffective when signal constellations used with antennas differ. According to the ABPA scheme, as the number of transmission antennas increases, the number of operations for bit and power allocation and feedback information from a reception side to a transmission side increases more rapidly.

In addition, as a scheme for reducing the number of operations for bit allocation and feedback information from a reception side to a transmission side, the Simplified Bit Allocation (SBA) scheme has been proposed as described above. According to the SBA scheme, a modulation scheme having an equal signal constellation is applied to each sub-channel by allocating an equal number of bits to the sub-channels, thereby significantly reducing the amount of operation for finding an optimum detection sequence and a sub-channel for bit allocation. Also, according to the SBA scheme, an equal number of bits is allocated to each sub-channel, and the transmission side does not need information for power allocation, so that feedback information from the reception side to the transmission side is reduced. Since the SBA scheme applies an equal modulation scheme only to selected sub-channels but allocates no bit to unselected channels, an overall transmission rate is reduced due to the channels to which no bit has been allocated. In order to prevent such a problem in the SBA scheme, a higher-level modulation technique than the original one must be used for the selected sub-channels. As a result, the SBA scheme has advantages in that it increases the probability of symbol error on sub-channels to which bits have been allocated and it has a much inferior bit error rate performance to the ABPA scheme.

FIGS. 2A and 2B are block diagrams illustrating the constructions of transmission and reception sides in a V-BLAST-detector-based MIMO-OFDM system to which the ACBA scheme is applied according to an embodiment of the present invention. FIG. 2A illustrates the construction of a transmitter and FIG. 2B illustrates the construction of a receiver.

Referring to FIG. 2A, the transmitter of the system according to an embodiment of the present invention includes an encoder 211, a symbol mapper 213, a serial-to-parallel converter 215, a bit allocation unit 217, an inverse fast Fourier transform (IFFT) unit 219, a parallel-to-serial converter 221, and a radio frequency (RF) processor 223, and a plurality of antennas ANT#1 to ANT#M.

Referring to FIG. 2B, the receiver of the system according to an embodiment of the present invention includes a plurality of antennas ANT#1 to ANT#N, an RF processor 225, a serial-to-parallel converter 227, a fast Fourier transform (FFT) unit 229, an interference removing unit 231, a channel state information (CSI) estimation unit 233, a buffer 235, a parallel-to-serial converter 237, a soft demapper 239, and a channel decoder 241.

The transmission and reception procedures according to embodiments of the present invention will now be described with reference to the constructions shown in FIGS. 2A and 2B. First, the receiver receives through a plurality of reception antennas a plurality of signals, which have been transmitted from the transmitter. Next, the receiver transmits to the transmitter channel state information (CSI), which represents characteristics of multiple transmission channels to be used for data transmission. Then, the transmitter determines if each sub-channel is available for data transmission on the basis of the channel state information received from the receiver. Thereafter, the transmitter transmits data to the receiver according to the determined result. The channel state information is transferred from the receiver to the transmitter and is used to control signal processing such as coding, modulating, etc.

The operation of the transmitter will now be described. When user data bits and control data bits to be transmitted are generated, the user data bits and control data bits are input to the encoder 211. For convenience of description, the user data bits and control data bits will be referred to as the "information data bits". The encoder 211 encodes the information data bits in a predetermined coding scheme, and then outputs the coded bits to the symbol mapper 213. Herein, the coding scheme may include a convolutional coding scheme or a turbo coding scheme having a predetermined coding rate.

The symbol mapper 213 modulates the coded bits output from the encoder 211 in a predetermined modulation scheme, thereby modulating symbols. Then, the symbol mapper 213 outputs the modulated symbols to the serial-to-parallel converter 215. The modulation scheme includes the quadrature phase shift keying (QPSK) scheme or the 16-quadrature amplitude modulation (16QAM) scheme. The serial-to-parallel converter 215 converts the serial modulated symbols output from the symbol mapper 213 into parallel symbols, and then outputs the parallel symbols to the bit allocation unit 217.

The bit allocation unit 217 inserts a bit into the parallel modulated symbols output from the serial-to-parallel converter 215, and then outputs the bit-inserted symbols to the IFFT unit 219. In this case, when bit allocation by the bit allocation unit 217 is actually performed, a period of time for the transmission of the feedback information from the receiver to the transmitter is delayed. That is, a time period equal to as much as the sum of the transmission time period and the operation time periods of the transmitter and receiver is delayed. The operation of the bit allocation unit 217 according to an embodiment of the present invention will be described in detail later.

The IFFT unit 219 receives a signal output from the bit allocation unit 217, performs N-point IFFT for the received signal, and then outputs the transformed signal to the parallel-to-serial converter 221. The parallel-to-serial converter 221 receives the signal output from the IFFT unit 219, converts the signal into a serial signal, and then outputs the serial signal to the RF processor 223. The RF processor 223 includes a filter, a front end unit, etc. The RF processor 223 receives the signal output from the parallel-to-serial converter 221, performs an RF processing for the received signal so that the received signal output from the parallel-to-serial converter 221 may be transmitted over the air, and then outputs the RF processed signal through a transmission antenna over the air.

The operation of the receiver will now be described. First, the receiver receives signals, which have transmitted from the transmitter, through N number of reception antennas via multipath fading radio channels. Then, the RF processor 225 receives a signal received through the reception antenna, performs an RF processing for the received signal to convert the received signal into a baseband digital signal, and then outputs the baseband digital signal to the serial-to-parallel converter 227. The serial-to-parallel converter 227 receives the signal output from the RF processor 225, converts the received signal into a parallel signal, and then outputs the parallel signal to the FFT unit 229.

The FFT unit 229 receives the signal output from the serial-to-parallel converter 227, performs N-point FFT for the received signal, and then outputs the transformed signal to the interference removing unit 231. The interference removing unit 231 receives the signal output from the FFT unit 229, removes interference such as noise contained in the received signal, and then outputs the interference-removed signal to both of the channel state information estimation unit 233 and the parallel-to-serial converter 237. The channel state information estimation unit 233 receives the signal output from the interference removing unit 231, generates channel state information in relation to transmission channels used for data transmission, feedbacks the channel state information to the transmitter, and then outputs the channel state information to the buffer 235 to store the channel state information in the buffer 235. The feedback information is transmitted to the transmitter, for example, through a dedicated physical channel or the like.

The parallel-to-serial converter 237 receives the signal output from the interference removing unit 231, converts the received signal into a serial signal, and then outputs the serial signal to the soft demapper 239. The soft demapper 239 receives the signal output from the parallel-to-serial converter 237, demodulates the received signal in a demodulation scheme corresponding to that employed in the transmitter so as to generate reception information data bits, and then outputs the reception information data bits to the channel decoder 241. The channel decoder 241 receives the information data bits, decodes the received bits according to in a predetermined decoding scheme, and then outputs the decoded signal.

The system having the above-mentioned construction and employing the ACBA scheme according to an embodiment of the present invention ensures a sub-channel for bit allocation by controlling a channel code rate, differently from other systems employing the SBA scheme.

When it is assumed that the number of sub-channels to which a bit is allocated through the bit allocation unit 217 in the transmission side is 'D', the number of sub-channels $D_{SBA}$ to which bits are allocated in a system employing the SBA scheme may be calculated by Equation 16, and the number of sub-channels $D_{ACBA}$ to which bits are allocated in the system employing the ACBA scheme according to an embodiment of the present invention may be calculated by Equation 17.

$$\text{CONVENTIONAL SBA ALGORITHM: } D_{SBA} = |R_b \times R^{-1}/(K+\Delta K)| \quad (16)$$

$$\text{PROPOSED ACBA ALGORITHM: } D_{ACBA} = |R_b \times (R+\Delta R)^{-1}/K| \quad (17)$$

In Equations 16 and 17, '$R_b$' represents the number of information bits to be transmitted, 'R' represents a channel code rate applied in the MIMO-OFDM system when a V-BLAST detector does not employ a bit allocation algorithm, and 'K' represents the number of bits per symbol applied in the MIMO-OFDM system when a V-BLAST detector employing no bit allocation algorithm is used. 'ΔK' represents the number of bits additionally allocated to a symbol in order to ensure a sub-channel for bit allocation in the SBA algorithm, and 'ΔR' represents an increment of a channel code rate additionally required in order to ensure a sub-channel for bit allocation in the ACBA algorithm. For example, when the original channel code rate is 'R=1/3' and a channel code rate in the proposed ACBA scheme is 'R'=1/2 (R'>R)', the increment of a channel code rate is given as 'ΔR=R'−R=1/6' to meet with 'R+ΔR=R''.

The ACBA algorithm according to an embodiment of the present invention may be analyzed to perform four steps or procedures as follows.

<First Procedure>

The numbers of bits allocated to all of the sub-channels are set to zero, and the number of sub-channels $D_{ACBA}$ required for bit allocation is calculated by Equation 17. Then, in the state in which the number of bits allocated to all of the sub-channels have been set to zero as described above, a V-BLAST detection sequence for each subcarrier is determined.

<Second Procedure>

A weight vector $w_{k_i,c}$ for each of the subcarriers is acquired according to the V-BLAST detection sequence determined for each of the subcarriers. A sub-channel having the smallest 2-Norm value among all of the sub-channels is found using the weight vector $w_{k_i,c}$, and is selected as a sub-channel for bit allocation. The selected sub-channel is excluded in a sub-channel selection procedure for finding a sub-channel to which the next bit is allocated. Such a procedure is repeated until the number of selected sub-channels meets with '$D_{ACBA} = |R_b \times (R+\Delta R)^{-1}/K|$' of Equation 17.

<Third Procedure>

K bits are allocated for all of the selected sub-channels. 'K' is a fixed integer, and has a value equal to the number of bits per symbol in the MIMO-OFDM system which includes a V-BLAST detector employing no bit allocation scheme. The MIMO-OFDM system using a V-BLAST detector employing the ACBA scheme has the same bit transmission rate as that of a MIMO-OFDM system using a typical V-BLAST detector employing no ACBA scheme.

<Fourth Procedure>

Finally, a set of new weight vectors $w_{k_i,c}$ for the V-BLAST detection is acquired as a result of the bit allocation. That is, when there are unused sub-channels, a set of weight vectors $w_{k_i,c}$ for sub-channels except for the unused sub-channels can be acquired. In this case, the V-BLAST detection procedure is performed with the exception of the unused sub-channels.

The above-mentioned procedures may be classified into an initialization process and a repeated execution process, which may be expressed as Equations 18 and 19, respectively.

Initialization:

$m_{i,c} = 0$ for all i and c $D' = 0$ $S = \{(i,c): i, \ldots, M, c = 1, \ldots, N_c\}$ (18)

Repeated execution:

$$(i^*, c^*) = \arg\min_{(i,c) \in S} \|w_{k_i,c}\|^2 \quad (19)$$

$$m_{i^*,c^*} = K$$

$$D' = D' + 1$$

$$S = S \setminus \{(i^*, c^*)\}$$

As expressed in Equations 18 and 19, when it is assumed that the system has $N_c$ subcarriers and M transmission antennas, the number of existing sub-channels is $M \times N_c$, and the operation of Equation 19 is repeated until $$(i^*, c^*) = \arg\min_{(i,c) \in S} \|w_{k_i,c}\|^2$$

and $m_{i^*,c^*} = K$ meet with $D' = D_{ACBA}$ to allocate all bits. In this case, the transmission power of sub-channels to which no bit is allocated becomes zero. Then, when the bit allocation has been completed, a V-BLAST detection is performed by using the set of new weight vectors $w_{k_i,c}$ for the transmission antennas used for each of the subcarriers.

When the bit allocation is actually employed, a time delay occurs during the transmission of feedback information from the reception side to the transmission side, that is, the transmission time period of the feedback information is delayed as much as the sum of a transmission time period and operation time periods of the transmission/reception sides.

To be specific, when a distance between a transmission side (e.g. a base station) and a reception side (e.g. a mobile station) is d (in meters) and the sum of operation time periods of the transmission and reception sides is $T_{processing}$ (in seconds), a delayed time period $DT_{Feedback}$ (in seconds) of feedback information may be expressed as Equation 20.

$$DT_{Feedback} = T_{processing} + \frac{d}{v_L} \quad (20)$$

In Equation 20, $v_L$ represents the flux of light, $v_L = 3 \times 10^8$ [m/sec]. When the reception side calculates information regarding channels and feedbacks the information to the transmission side, the feedback time period is delayed as much as $DT_{Feedback}$ obtained by Equation 20. In addition, since the channel state varies during the delayed feedback time period, the transmission side allocates bits to the sub-channels with channel information containing an error. Therefore, when the ABPA scheme is employed, an error occurs in the number of allocated bits and the allocated power, and when the ACBA or the SBA scheme is employed, a phenomenon in which a sub-channel to be used changes occurs.

The performance of the above-mentioned V-BLAST MIMO-OFDM system to which the Adaptive Coding Bit Allocation (ACBA) technique is applied according to embodiments of the present invention will be described with reference to the accompanying drawings.

By way of example, the following assumptions are set to estimate the performance of the V-BLAST MIMO-OFDM system employing the ACBA scheme according to an embodiment of the present invention.

Frequency-selective fading channels which include three paths having exponentially decreasing path gains are considered as a channel model, Doppler frequencies of 300 Hz and 600 Hz are considered, and it is assumed that the channel estimation and the system synchronization have been completely achieved. Also, 64 subcarriers are used for OFDM, an OFDM symbol period is set to be 4 μsec, and a protection period is set to be 0.8 μsec. As a modulation scheme, the 64-QAM scheme is used for the SBA, and the 16-QAM scheme is used for the ACBA. In addition, as a channel code, a convolution code using a hard-decision Viterbi decoding algorithm is considered for a system to which no soft demapper is connected, and a convolutional code using a soft-decision Viterbi decoding algorithm having a quantization level of 32 is considered for a system to which the soft demapper is connected. In these cases, code rates of 1/2, 1/3 and 1/4 are considered to be used. Also, it is assumed for equal test conditions that the number of information bits $R_b$ to be transmitted is 256. for all of the tests and a bit transmission rate is 64 Mbps for all of the systems.

FIGS. 3A to 6B are graphs for comparing bit error rate (BER) performances of the ACBA and other techniques according to '$E_b/N_o$', with respect to various cases in which the techniques have distinct combinations of transmission and reception antennas. Particularly, each of FIGS. 3A to 6B show performances according to the soft-decision Viterbi decoding and the hard-decision Viterbi decoding. FIGS. 3A to 6B show test results obtained in an identical environment in which feedback information of a channel state transferred from the reception side to transmission side has no error and no arrival delay.

Figure 3A:
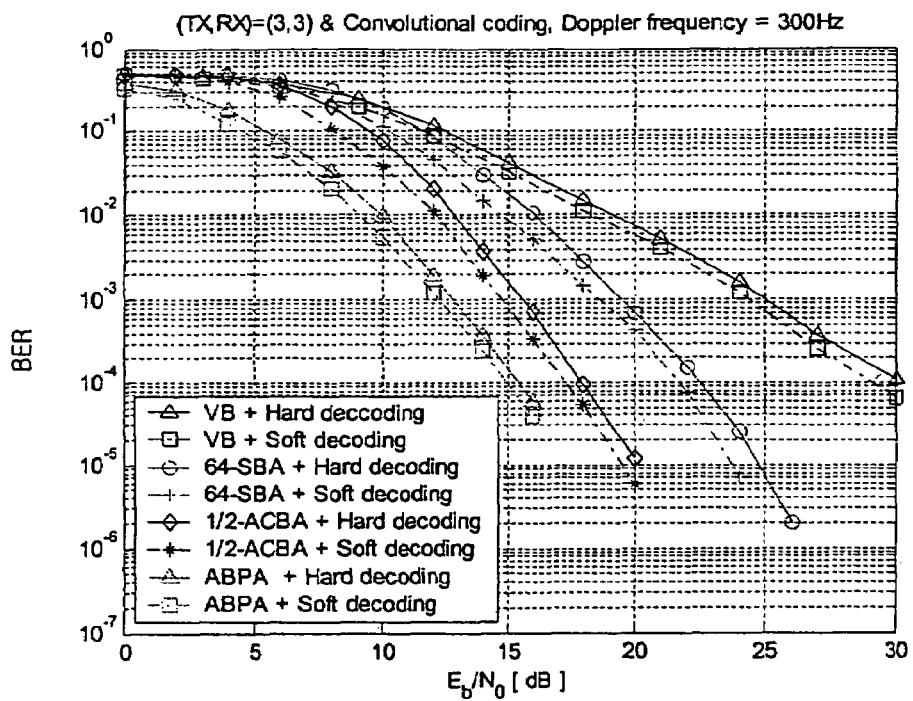
FIGS. 3A and 3B are graphs comparing of bit error rate performances of V-BLAST MIMO-OFDM systems to each of which the ACBA technique according to an embodiment of the present invention or one of other techniques is applied.
Figure 3B:
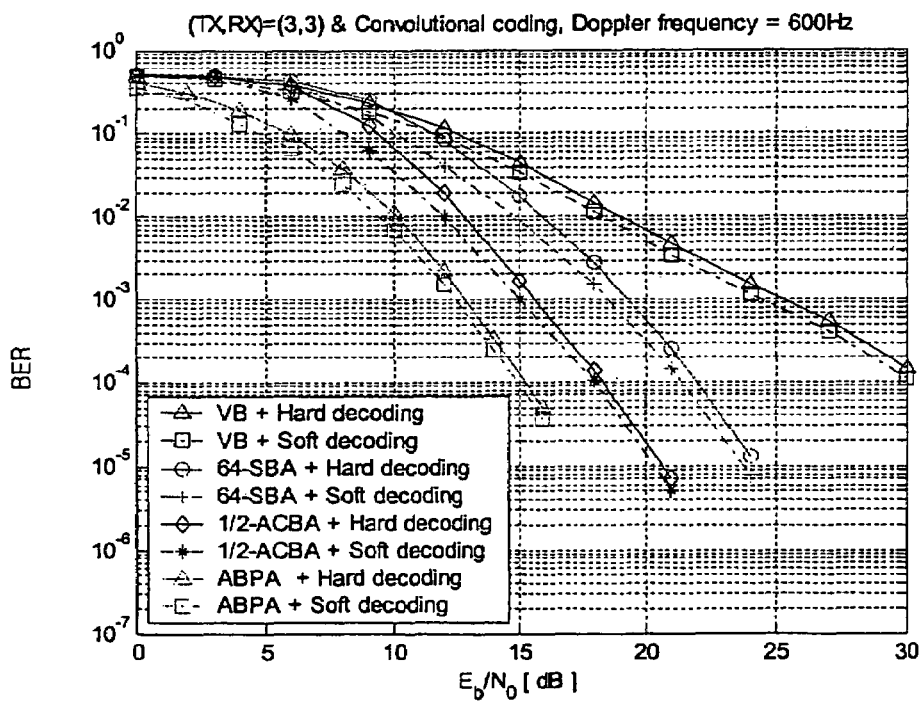

FIGS. 3A and 3B are graphs comparing of bit error rate performances of V-BLAST MIMO-OFDM systems to each of which the ACBA technique according to an embodiment of the present invention or one of other techniques is applied. FIGS. 3A and 3B show bit error rate performances of the ACBA scheme according to the present invention and the conventional schemes in a V-BLAST MIMO-OFDM system including three transmission antennas and three reception antennas, in which FIGS. 3A and 3B refer to cases in which Doppler frequencies of 300 Hz and 600 Hz are used, respectively.

Referring to FIGS. 3A and 3B, it can be confirmed with respect to BER=$10^{-4}$ that an ACBA scheme ("1/2-ACBA") using a 1/2-rate convolutional code provides an inferior bit error rate performance by approximately 2.5 dB to that provided by an identical ABPA scheme ("ABPA") in both cases of the Doppler frequencies of 300 Hz and 600 Hz, but the ACBA scheme provides an improved bit error rate performance by approximately 5 dB without increasing the amount of feedback information and the number of operations for bit allocation as compared with that provided by an SBA scheme ("64-SBA"). Also, it can be confirmed that the V-BLAST MIMO-OFDM system employing the ACBA scheme has an improved bit error rate performance by approximately 12 dB at BER=$10^{-4}$, as compared with a V-BLAST MIMO-OFDM system ("VB") to which no bit allocation is applied.

Figure 4A:
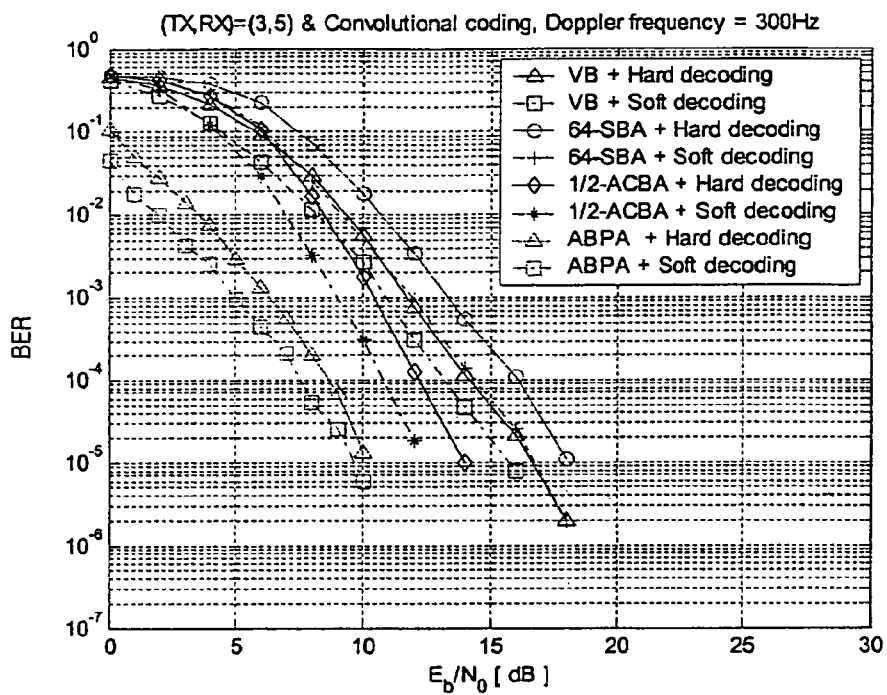
FIGS. 4A and 4B are graphs comparing of bit error rate performances of V-BLAST MIMO-OFDM systems to each of which the ACBA technique according to an embodiment of the present invention or one of other techniques is applied.
Figure 4B:
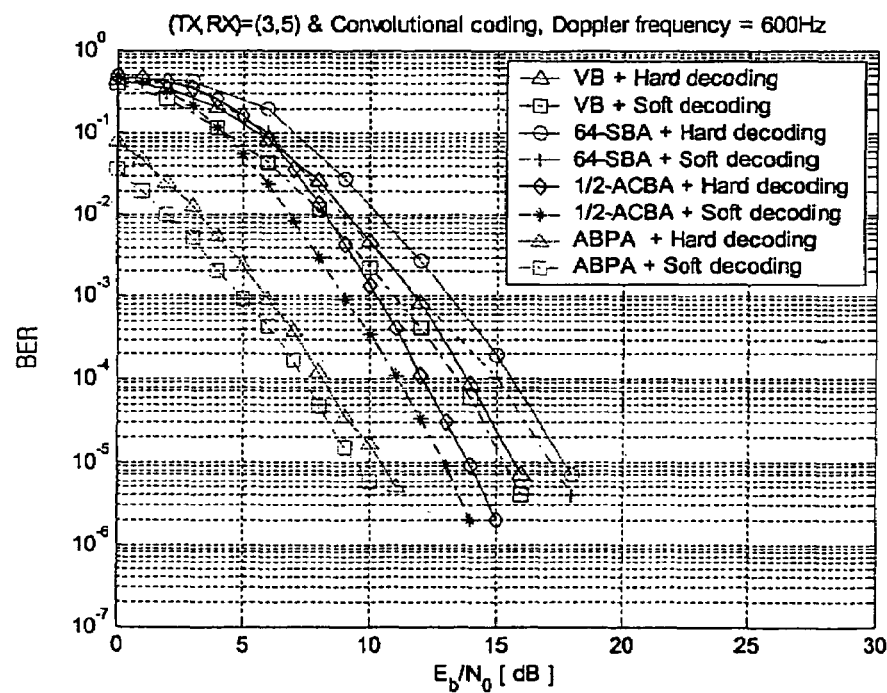

FIGS. 4A and 4B are graphs for illustrating the comparison of bit error rate performances of V-BLAST MIMO-OFDM systems to each of which the ACBA technique according to an embodiment of the present invention or one of other techniques is applied.

FIGS. 4A and 4B show bit error rate performances of the ACBA scheme according to the present invention and the conventional schemes in a V-BLAST MIMO-OFDM system including three transmission antennas and five reception antennas, in which FIGS. 4A and 4B refer to cases in which Doppler frequencies of 300 Hz and 600 Hz are used, respectively.

Referring to FIGS. 4A and 4B, similar to the case of the FIGS. 3A and 3B, it can be understood with respect to BER=$10^{-4}$ that an ACBA scheme using a 1/2-rate convolutional code provides an inferior bit error rate performance by approximately 3 dB to that provided by an ABPA scheme in both cases of the Doppler frequencies of 300 Hz and 600Hz, and a V-BLAST MIMO-OFDM system employing the SBA scheme has a rather inferior bit error rate performance by approximately 2 dB to a V-BLAST MIMO-OFDM system employing no bit allocation. In contrast, it can be seen that the V-BLAST MIMO-OFDM system employing the ACBA scheme according to the present invention provides an improved bit error rate performance by approximately 2 dB as compared with a V-BLAST MIMO-OFDM system that does not employ bit allocation, while having the same amount of feedback information and the same number of operations for bit allocation as those of the V-BLAST MIMO-OFDM system employing the SBA scheme.

Figure 5A:
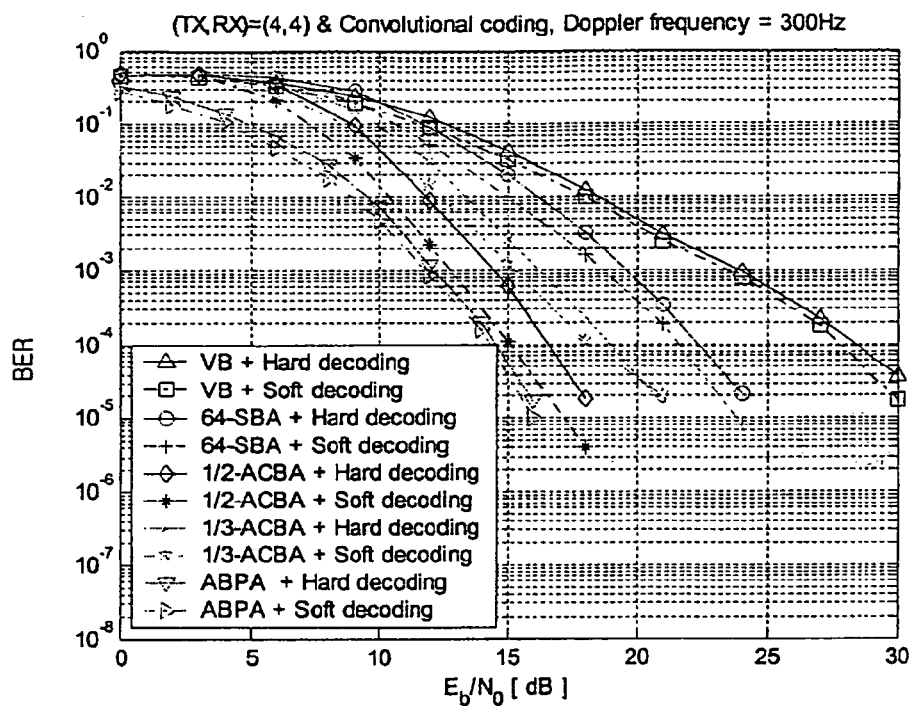
FIGS. 5A and 5B are graphs comparing of bit error rate performances of V-BLAST MIMO-OFDM systems to each of which the ACBA technique according to an embodiment of the present invention or one of other techniques is applied.
Figure 5B:
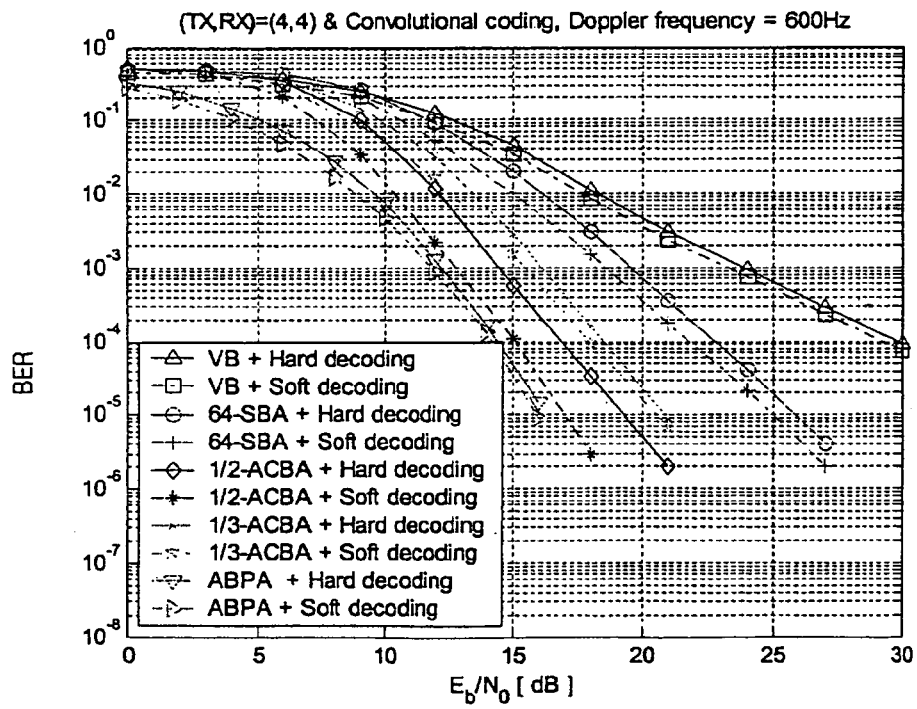

FIGS. 5A and 5B are graphs for illustrating the comparison of bit error rate performances of V-BLAST MIMO-OFDM systems to each of which the ACBA technique according to an embodiment of the present invention or one of other techniques is applied.

FIGS. 5A and 5B show the comparison of bit error rate performances with respect to a V-BLAST MIMO-OFDM system including four transmission antennas and four reception antennas. Referring to FIGS. 5A and 5B, it can be confirmed with respect to BER=$10^{-4}$ that the V-BLAST MIMO-OFDM system employing the SBA scheme provides an improved bit error rate performance by approximately 5 dB as compared with the V-BLAST MIMO-OFDM system that does not employ bit allocation, but provides an inferior bit error rate performance by approximately 7.5 dB as compared with the V-BLAST MIMO-OFDM system employing the ABPA scheme.

In addition, it can be confirmed that the V-BLAST MIMO-OFDM system employing an ACBA scheme using a code rate of 1/3 and a Doppler frequency of 300 Hz provides an improved bit error rate performance by 11.5 dB as compared with the V-BLAST MIMO-OFDM system that does not employ bit allocation, and provides an improved bit error rate performance by approximately 5 dB as compared with the V-BLAST MIMO-OFDM system that employs the SBA scheme. In contrast, it can be understood that the V-BLAST MIMO-OFDM system including a soft demapper and employing an ABPA scheme using a code rate of 1/2 has the same amount of feedback information and the same amount of operation for bit allocation as those of the V-BLAST MIMO-OFDM system employing the SBA scheme, different from those of the V-BLAST MIMO-OFDM system that does not employ bit allocation. Also, it can be confirmed that the V-BLAST MIMO-OFDM system that employs the ACBA has a gain of approximately 14.5 dB in view of the bit error rate performance, and provides the performance deteriorated only by approximately 1 dB as compared with the V-BLAST MIMO-OFDM system that employs the ABPA which has very large amounts of feedback information and requires a large number of operations for bit/power allocation.

Figure 6A:
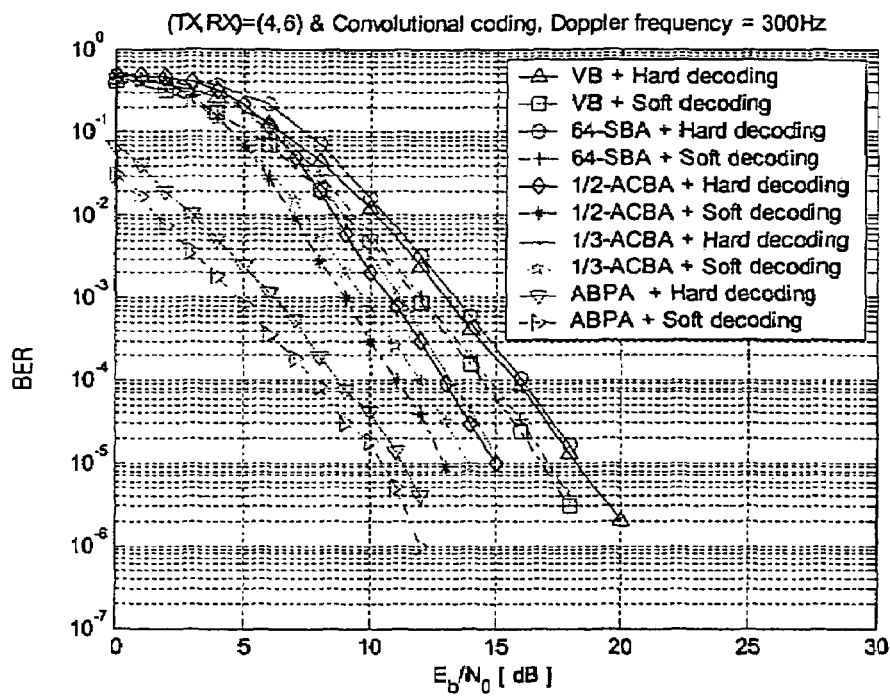
FIGS. 6A and 6B are graphs comparing of bit error rate performances of V-BLAST MIMO-OFDM systems to each of which the ACBA technique according to an embodiment of the present invention or one of other techniques is applied.
Figure 6B:
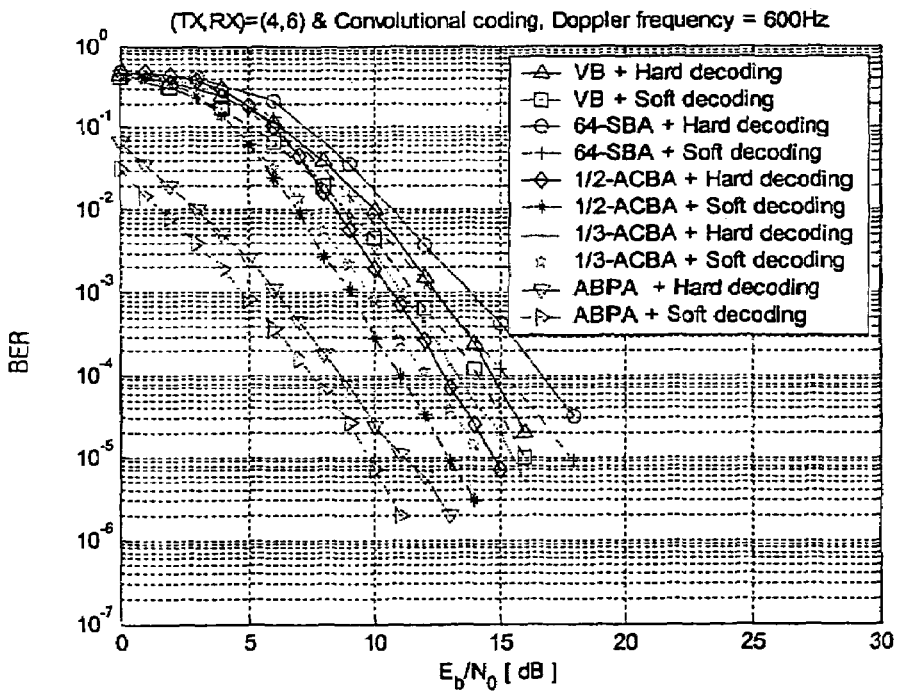

FIGS. 6A and 6B are graphs for illustrating the comparison of bit error rate performances of V-BLAST MIMO-OFDM systems to each of which the ACBA technique according to an embodiment of the present invention or one of other techniques is applied.

FIGS. 6A and 6B show the comparison of bit error rate performances with respect to a V-BLAST MIMO-OFDM system including four transmission antennas and six reception antennas. When a Doppler frequency of 600 Hz is used, it can be understood at BER=$10^{-4}$ that the ACBA using a code rate of 1/2 provides an inferior bit error rate performance by approximately 5 dB to the ABPA. It can be confirmed that the V-BLAST MIMO-OFDM system that employs the SBA scheme does not show any improvement in performance but rather shows deterioration of bit error rate performance by approximately 2 dB at BER=$10^{-4}$, as compared with the V-BLAST MIMO-OFDM system that does not employ bit allocation. In contrast, it can be confirmed that the V-BLAST MIMO-OFDM system that employs the ACBA according to the present invention provides an improved bit error rate performance by approximately 3 dB as compared with the V-BLAST MIMO-OFDM system that does not employ bit allocation, while having the same amount of feedback information and the same amount of operation for bit allocation as those of the V-BLAST MIMO-OFDM system that employs the SBA scheme.

The reason why the V-BLAST MIMO-OFDM system that employs the SBA scheme has inferior performance to the normal V-BLAST MIMO-OFDM system that does not employ bit allocation is that the V-BLAST MIMO-OFDM system that employs the SBA scheme uses a higher-level modulation scheme to ensure sub-channels for bit allocation than that of the normal V-BLAST MIMO-OFDM system. This phenomenon occurs, because the diversity gain when the modulation level does not increase in the normal V-BLAST MIMO-OFDM system is greater than the gain of the V-BLAST MIMO-OFDM system that employs the SBA scheme. In contrast, since the V-BLAST MIMO-OFDM system that employs the ACBA scheme does not increase its modulation level, its diversity gain does not decrease, thereby showing superior performance to that of the normal V-BLAST MIMO-OFDM system.

In addition, referring to FIGS. 3A to 6B, it can be confirmed that a system that performs the soft-decision Viterbi decoding by associating the soft demapper in the OSIC procedure has a gain of approximately 1 to 2 dB in the bit error rate performance, as compared with a system that performs the hard-decision Viterbi decoding without a soft demapper.

Figure 7:
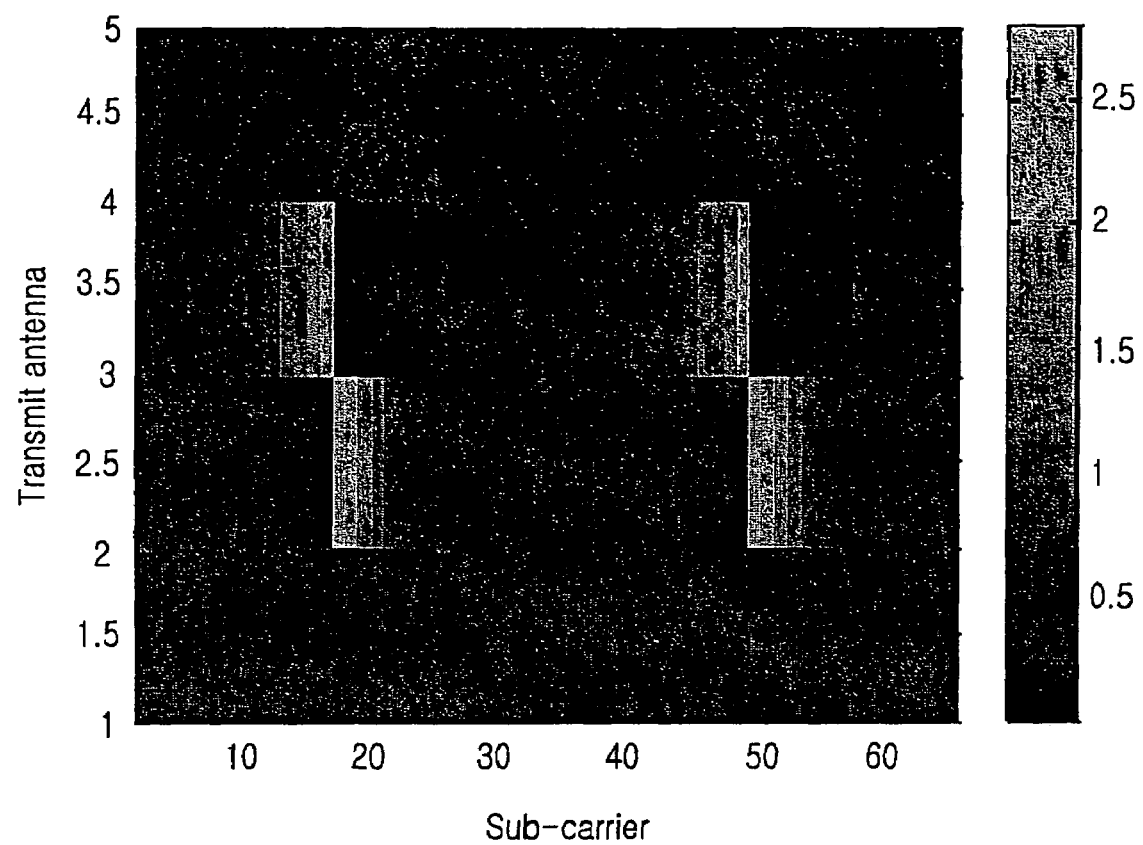
FIG. 7 is a diagram of a 2-Norm value of a weight vector for sub-channels according to an embodiment of the present invention.
Figure 8:
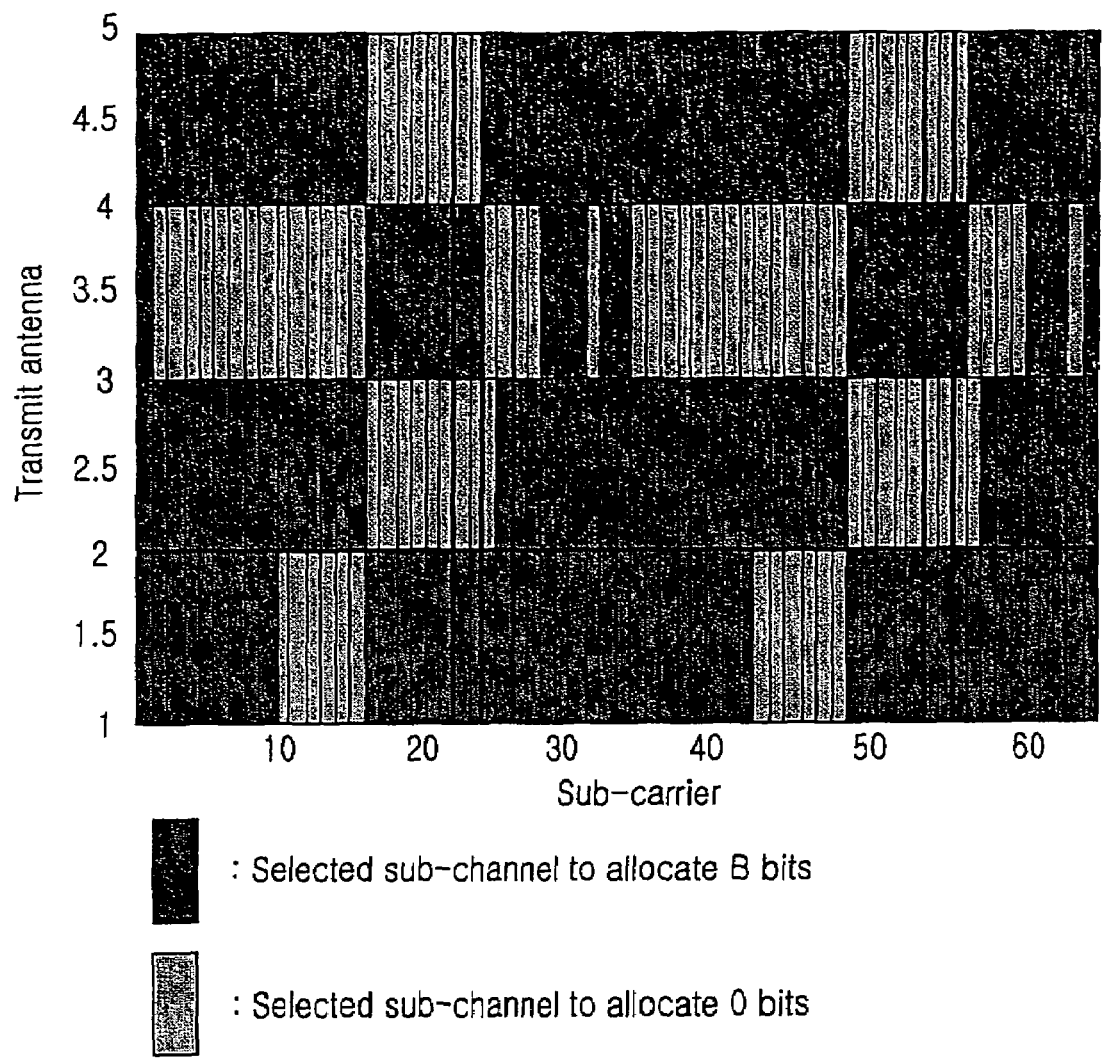
FIG. 8 is a diagram of sub-channels to which bits are actually allocated according to an embodiment of the present invention.

FIG. 7 is a diagram of a 2-Norm value of a weight vector $w_{k_j,c}$ for sub-channels according to an embodiment of the present invention, and FIG. 8 is a diagram of sub-channels to which bits are actually allocated according to an embodiment of the present invention.

FIG. 7 shows a 2-Norm value of a weight vector $w_{k_j,c}$ for each sub-channel and FIG. 8 shows sub-channels to which a random 'B' number of bits are allocated through a bit allocation procedure by Equations 18 to 24, under a frequency-selective fading channel environment that includes a Doppler frequency of 600 Hz in a system that includes four transmission antennas and four reception antennas.

FIG. 7 illustrates a case in which the coherence bandwidth of a channel occupies several subcarriers. In this case, it can be understood that the sub-channels to which the bits are consecutively allocated appears as shown in FIG. 8. In this case, it is possible to further significantly reduce the amount of feedback information from the reception side to the transmission side by using a predetermined compression scheme.

Figure 9A:
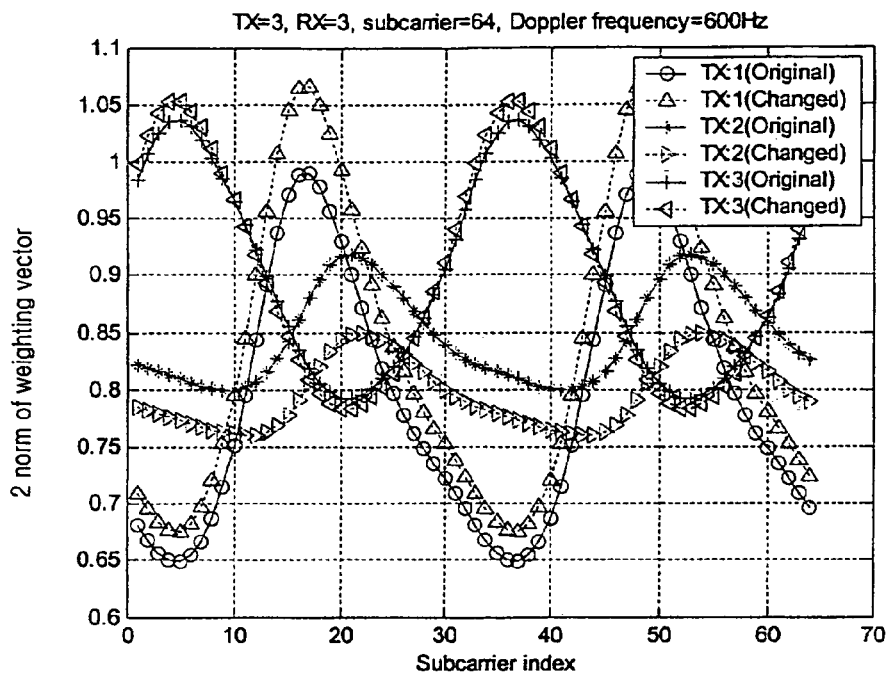
FIGS. 9A to 9D are graphs illustrating changes of a channel characteristic during a feedback delay period according to embodiments of the present invention.
Figure 9B:
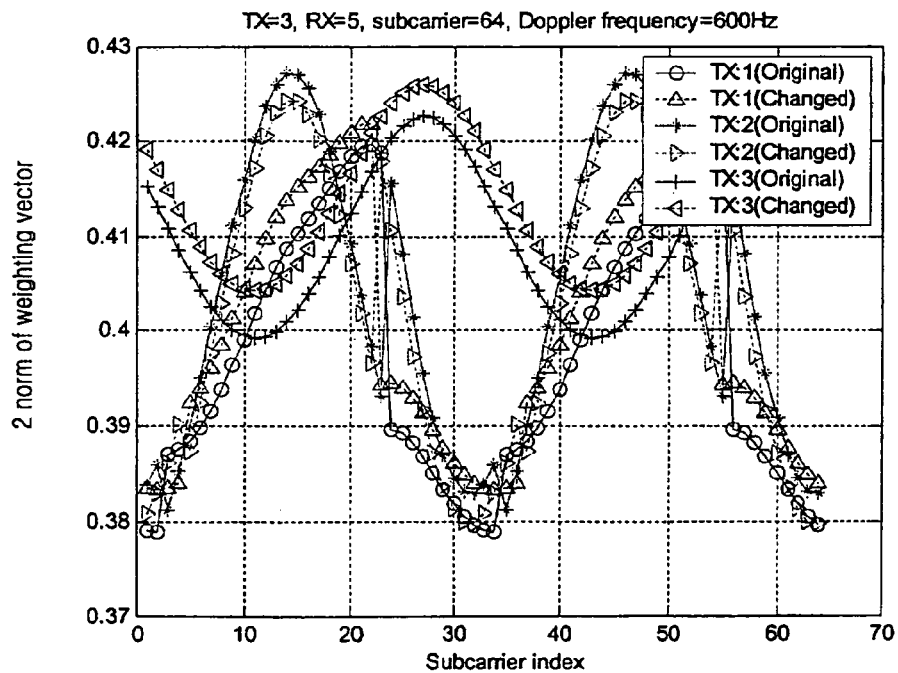
Figure 9C:
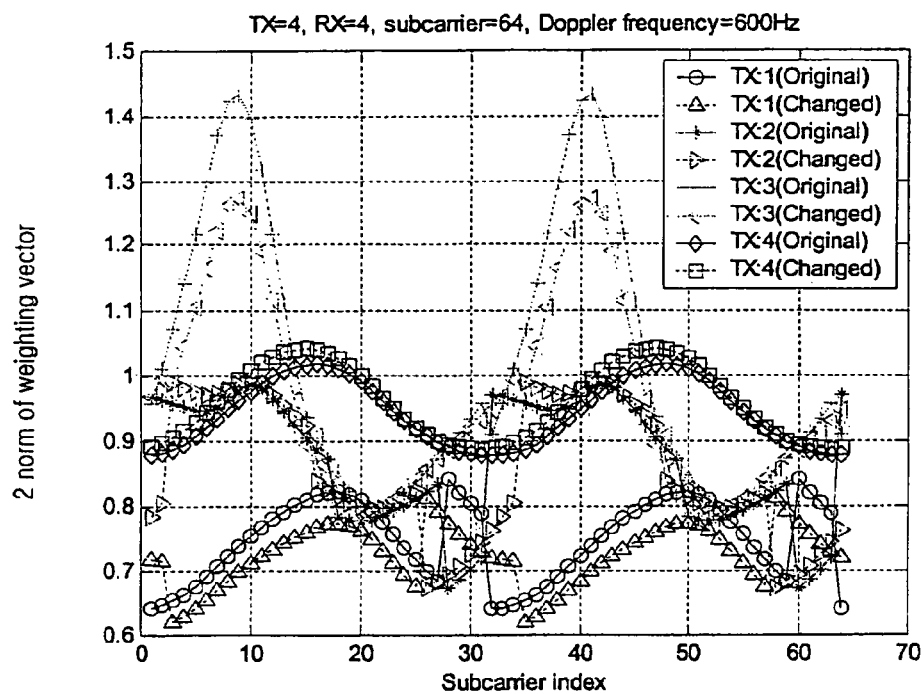
Figure 9D:
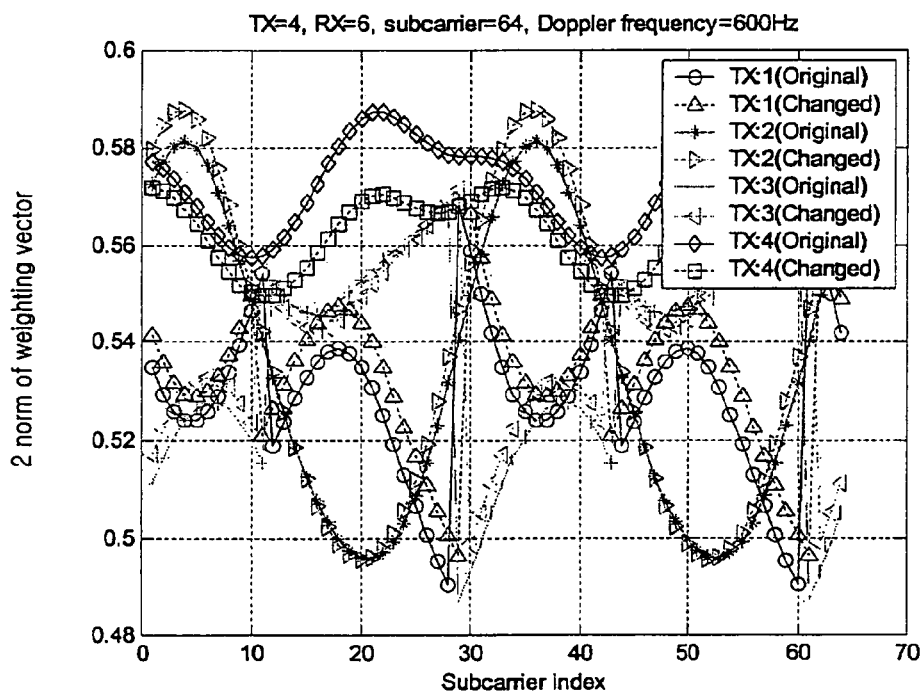

FIGS. 9A to 9D are graphs illustrating changes of a channel characteristic during a feedback delay period according to the embodiments of the present invention. FIG. 9A shows a channel characteristic when there are three transmission antennas and three reception antennas, FIG. 9B shows a channel characteristic when there are three transmission antennas and five reception antennas, FIG. 9C shows a channel characteristic when there are four transmission antennas and four reception antennas, and FIG. 9D shows a channel characteristic when there are four transmission antennas and six reception antennas.

FIGS. 9A to 9D show changes to the 2-Norm value of a weight vector $w_{k_j,c}$ for sub-channels of systems according to each combination of transmission antennas and reception antennas, when the feedback delay period is 16 μsec, a Doppler frequency is 600 Hz and the number of subcarriers is 64.

As shown in FIGS. 9A to 9D, when feedback information is delayed and arrives, a channel state changes, so that the transmission side performs the bit allocation procedure with channel information containing an error. As a result, in the case of a system employing the ABPA scheme, an error may occur in the number of bits and the power allocated to each sub-channel and a phenomenon that changes a sub-channel to which bits are actually allocated may also occur, so that the performance of the system is deteriorated. The bit error rate performances when a feedback delay exists as described above will be described with reference to FIGS. 10A to 13B.

FIGS. 10A to 11B are graphs comparing of the bit error rate performances of systems when there is a feedback delay according to embodiments of the present invention.

Figure 10A:
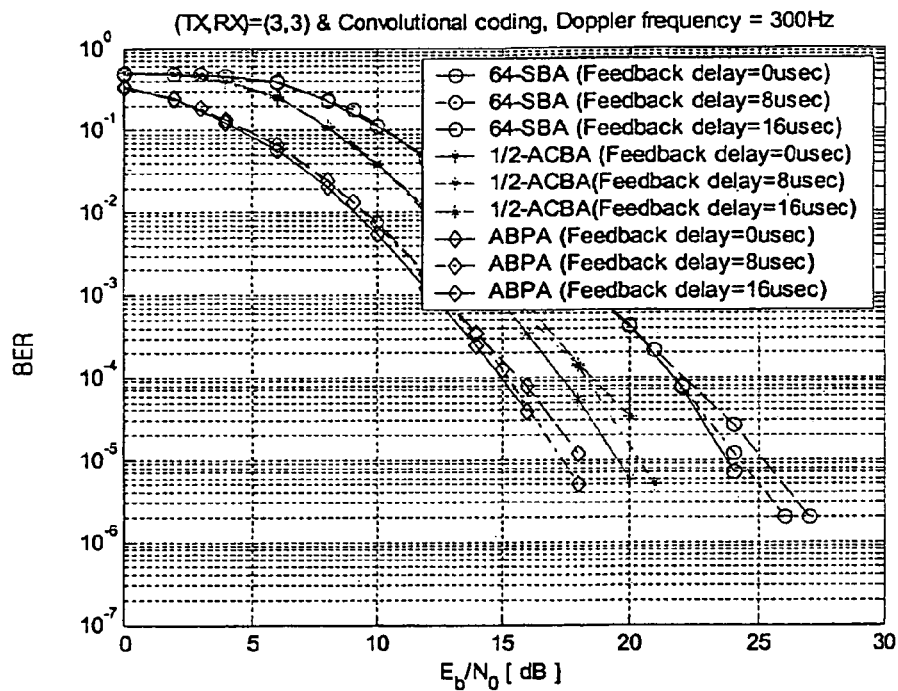
FIGS. 10A and 10B are graphs comparing of bit error rate performances of systems when a feedback delay exists according to embodiments of the present invention.
Figure 10B:
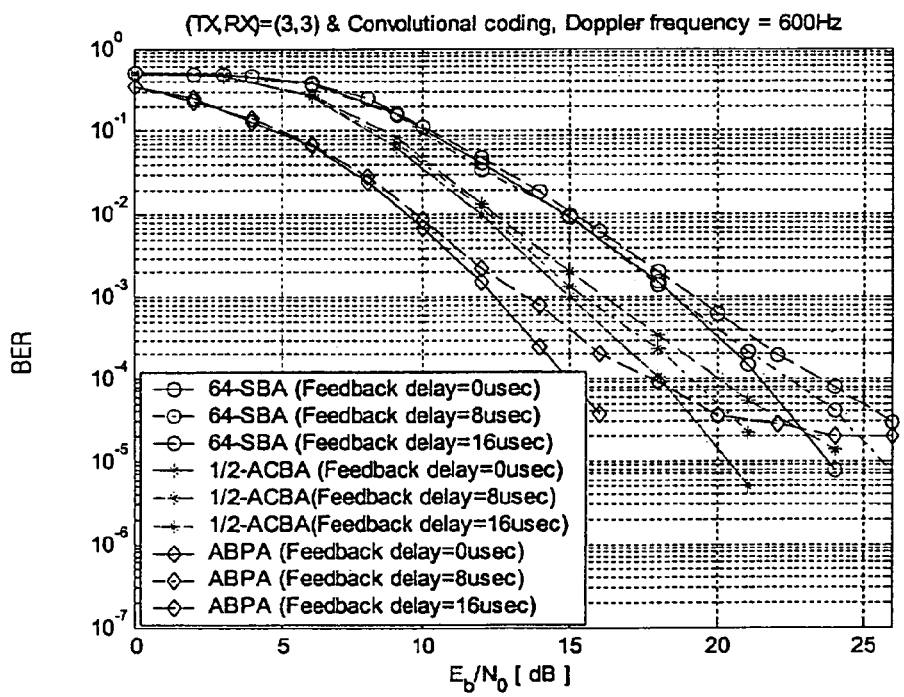
Figure 11A:
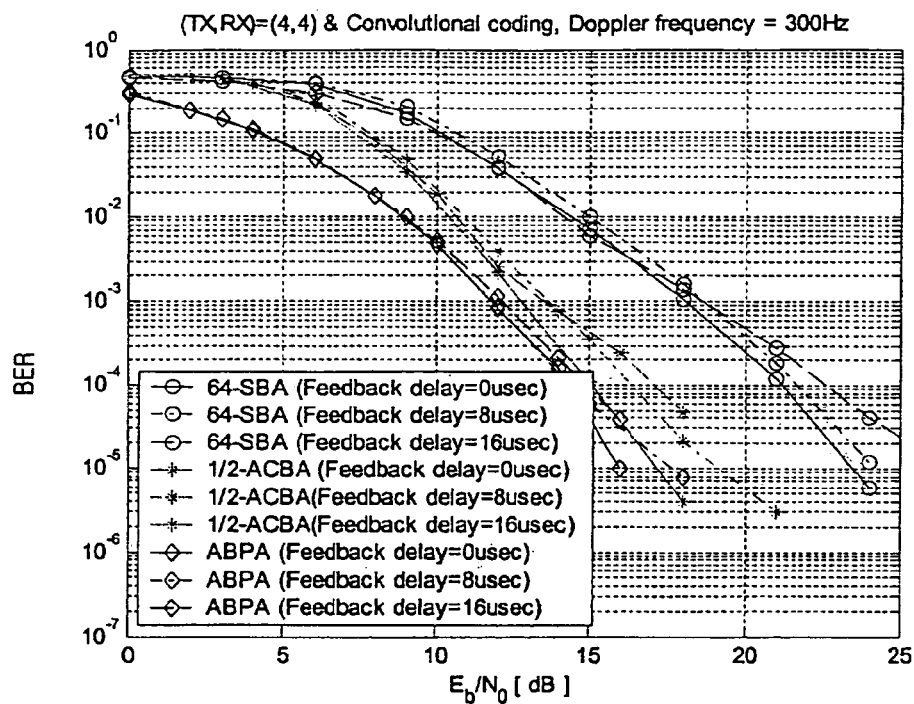
FIGS. 11A and 11B are graphs comparing of bit error rate performances of systems when a feedback delay exists according to embodiments of the present invention.
Figure 11B:
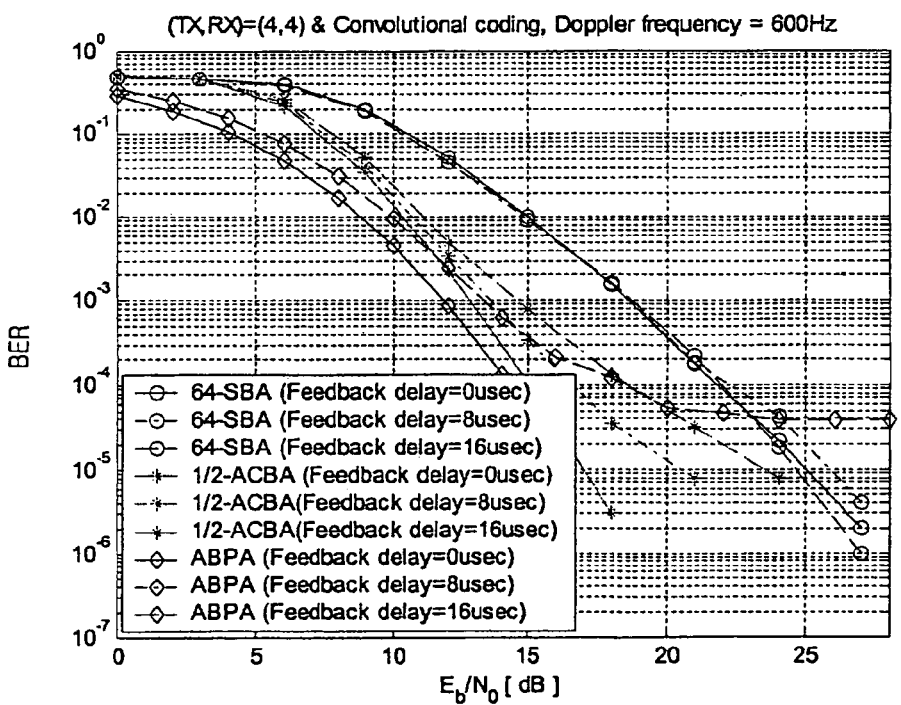

To be specific, FIG. 10A shows the case in which a feedback delay exists in a system that includes three transmission antennas and three reception antennas and uses a Doppler frequency of 300 Hz, and FIG. 10B shows the case in which a feedback delay exists in a system that includes three transmission antennas and three reception antennas and uses a Doppler frequency of 600 Hz. Also, FIG. 11A shows the case in which a feedback delay exists in a system that includes four transmission antennas and four reception antennas and uses a Doppler frequency of 300 Hz, and FIG. 11B shows the case in which a feedback delay exists in a system that includes four transmission antennas and four reception antennas and uses a Doppler frequency of 600 Hz.

FIGS. 10A to 11B show the comparison of bit error rate performances according to each channel state change with respect to various combinations of the transmission side and reception antennas. Particularly, FIGS. 10A to 11B illustrate the bit error rate performance of each system that uses a soft demapper in the OSIC procedure, under an environment in which feedback information regarding each channel state is delayed and arrives at the transmission side.

In the cases in which the Doppler frequency is 300 Hz (i.e. in FIGS. 10A and 11A), it can be confirmed that the bit error rate performance of each system is almost never influenced by an error of the channel state information caused by a feedback delay. However, in the cases where the Doppler frequency is 600 Hz and a feedback delay period is 16 μsec (i.e. in FIGS. 10B and 11B), it can be confirmed that the bit error rate performance rapidly deteriorates in the system that employs the ABPA scheme which have the large amount of feedback information. In the case of the system that employs the ABPA scheme and includes three transmission antennas and three reception antennas as shown in FIG. 10B, an error floor occurs at approximately BER=$10^{-4}$, and in the case of the system that employs the ABPA scheme and includes four transmission antennas and four reception antennas as shown in FIG. 11B, an error floor occurs at a bit error rate greater than $10^{-4}$.

In contrast, in the systems employing the ACBA scheme of the present invention and the SBA scheme, it can be confirmed that their performances are somewhat deteriorated due to an error of channel state information caused by feedback delay, but show superior characteristics as compared with the error of the channel state information due to the feedback delay in the system employing the ABPA scheme.

FIGS. 12A to 13B are graphs comparing of the bit error rate performances of systems that includes different numbers of transmission antennas and reception antennas when a feedback delay exists according to embodiments of the present invention.

Figure 12A:
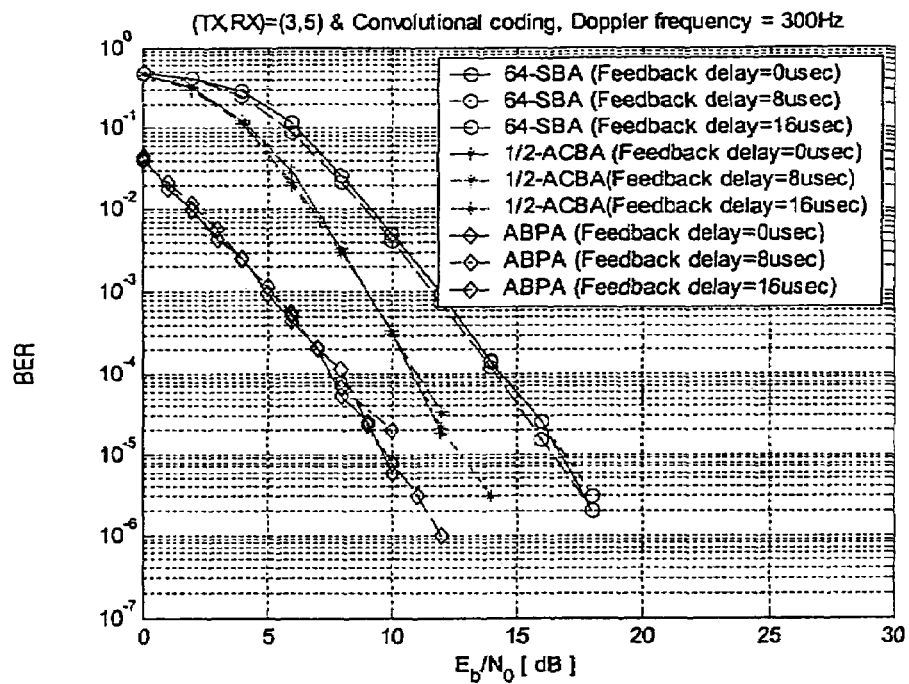
FIGS. 12A and 12B are graphs comparing of bit error rate performances of systems when a feedback delay exists according to embodiments of the present invention.
Figure 12B:
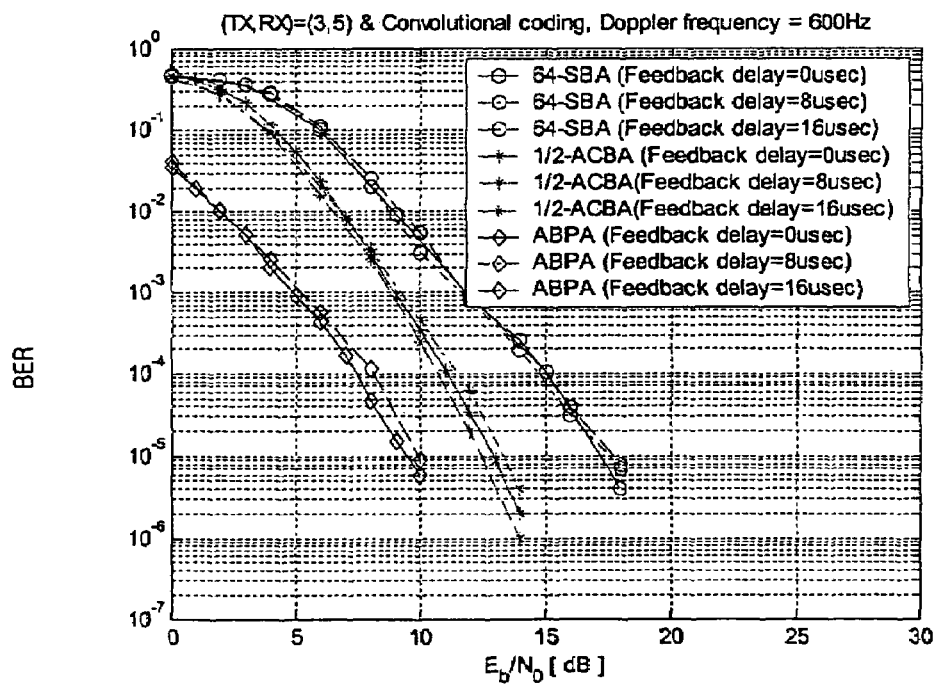
Figure 13A:
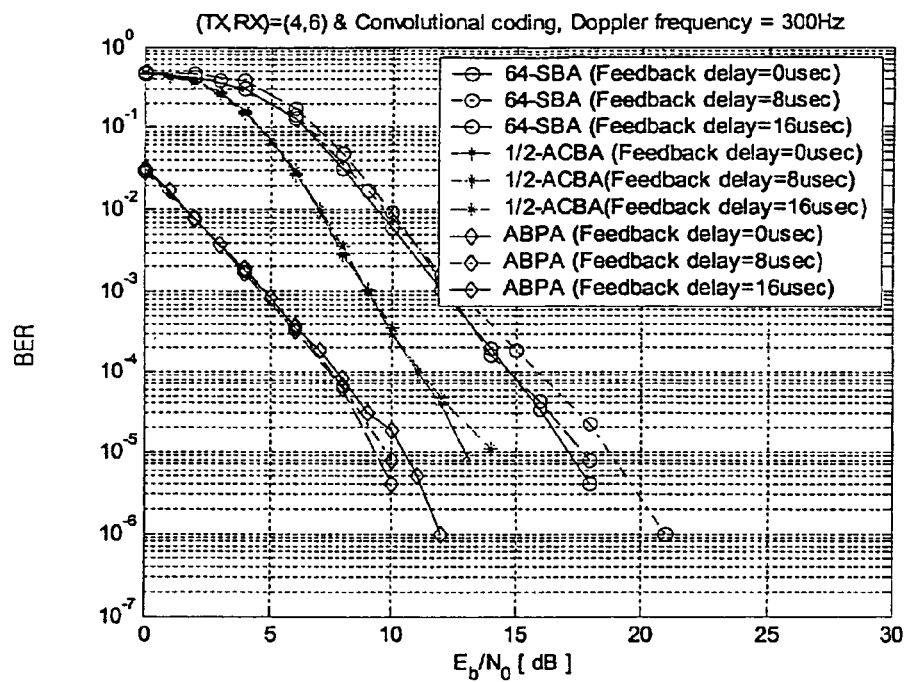
FIGS. 13A and 13B are graphs comparing of bit error rate performances of systems when a feedback delay exists according to embodiments of the present invention.
Figure 13B:
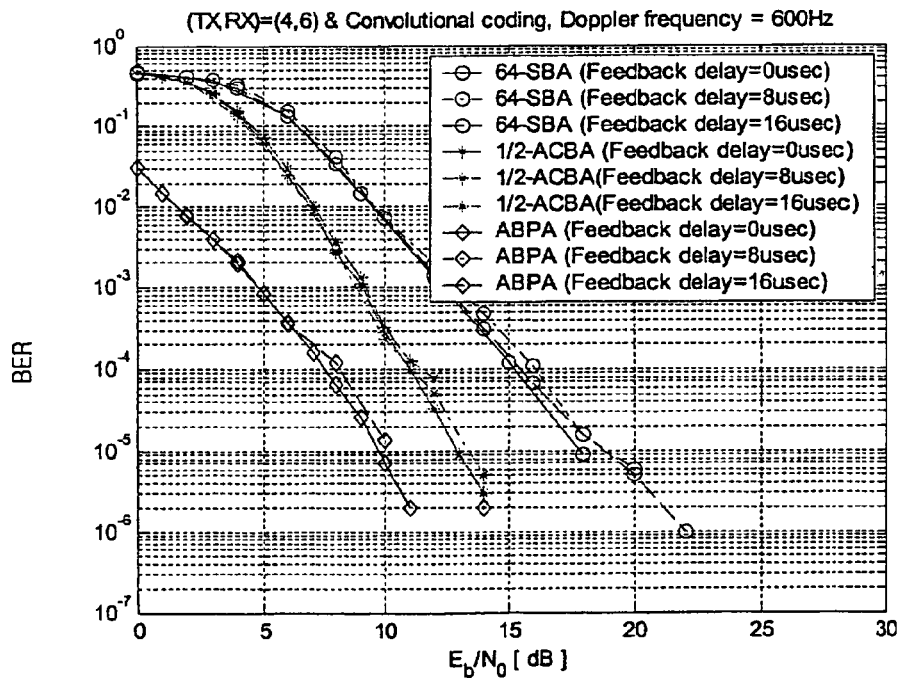

That is, FIGS. 12A and 12B shows the cases of systems which includes three transmission antennas and five reception antennas and thus have large reception diversity gains, in which FIGS. 12A and 12B refer to cases of Doppler frequencies of 300 Hz and 600 Hz, respectively. Also, FIGS. 13A and 13B shows the cases of systems which includes four transmission antennas and six reception antennas and thus have large reception diversity gains, in which FIGS. 13A and 13B refer to cases of Doppler frequencies of 300 Hz and 600 Hz, respectively.

In other words, FIGS. 12A and 12B and FIGS. 13A and 13B shows the bit error rate performance of each system according to feedback delay of each channel state information with respect to systems each of which have a different combination of the number of transmission antennas and the number of reception antennas. Referring to FIGS. 12A to 13B, in both cases in which the Doppler frequency is 300 Hz and 600 Hz, it can be understood that the bit error rate performances of the systems employing the ACBA scheme of the present invention and the SBA are almost never influenced by an error of channel state information caused by feedback delay. That is, it can be confirmed that the systems employing the ACBA scheme and the SBA have a bit error rate performance almost equal to that obtained in an identical environment having no feedback delay.

In the systems having relatively small reception diversity gains, that is, in the systems that include three transmission antennas and three reception antennas as shown in FIGS. 10A and 10B and in the systems that include four transmission antennas and four reception antennas as shown in FIGS. 11A and 11B, when the ABPA scheme is employed, the characteristics of these systems change depending on feedback delay. It can be confirmed that the systems having relatively large reception diversity gains, that is, the systems shown in FIGS. 12A and 12B and the systems shown in FIGS. 13A and 13B, show performances almost equal to that obtained in an environment having no feedback delay. This is because the increment of the diversity gain according to increase of the number of reception antennas is greater than the decrement of the performance gain due to feedback delay of the channel state information.

As described with reference to FIGS. 10A to 13B, it can be understood in the systems having a large reception diversity gain that the performances of these systems are almost never influenced by an error of channel state information due to feedback delay. However, in the system has a small reception diversity gain and employs an identical ABPA, it can be confirmed that the system performance is greatly deteriorated. In contrast, it can be confirmed that the system employing the ACBA of the present invention shows that the system performance is somewhat deteriorated but has a relatively superior characteristic with regard to an error of channel state information due to feedback delay.

Since the ABPA scheme allocates bits and power according to the channel gain of each sub-channel, the system employing the ABPA scheme shows a characteristic susceptible to the channel gain change of each sub-channel. In contrast, the ACBA scheme according to the present invention determines if it is necessary to allocate bits according to the priority of the magnitude of the channel gain value of each sub-channel among the channel gain values of all sub-channels, rather than according to the channel gain value itself of each sub-channel. Therefore, in the system employing the ACBA scheme, although the gain of each sub-channel changes, the combination of sub-channels to which bits are allocated almost never changes, so that the system employing the ACBA scheme has a relatively superior characteristic with regard to an error of channel state information due to feedback delay, as compared with the system employing the ABPA scheme.

The present invention proposes the ACBA scheme for the V-BLAST MIMO-OFDM system, which controls a channel code rate to minimize the amount of feedback information from the reception side to the transmission side and to reduce the number of operations for bit allocation. The ACBA scheme according to the present invention requires the same amount of feedback information and the same number of operations as those required in the SBA scheme which has been proposed in order to reduce the amounts of feedback information and of the conventional ABPA scheme allocating a different number of bits to each channel.

Also, the ACBA scheme according to the present invention performs bit allocation not by increasing a modulation level but by controlling a channel code rate, thereby greatly improving the bit error rate performance.

The conventional ABPA scheme performs bit and power allocation based on precise information of a channel state, so that the bit error rate performance is greatly deteriorated when information of the channel state is delayed and arrives under an environment having a low reception diversity gain. In contrast, the ACBA scheme according to the present invention exhibits a relatively superior characteristic with respect to feedback delay of information regarding the channel state.

The present invention refers to the ACBA algorithm for controlling a channel code rate to allocate an equal number of bits to each sub-channel in the MIMO-OFDM system using the V-BLAST detector. The ACBA scheme according to the present invention can significantly improve the bit error rate performance in the V-BLAST MIMO-OFDM system using a channel code, while having the same amount of feedback information and the same system complexity as those of the conventional SBA scheme. With such an advantage, the ACBA scheme according to the present invention may be utilized as a scheme for improving the performance of the 4G mobile communication system requiring a high-speed data transmission up to scores of Mbps.

According to the data transmission and signal processing method using channel state information in a wireless communication system based on embodiments of the present invention, bit allocation is performed by using the same modulation scheme as the normal V-BLAST OFDM scheme. Therefore, the data transmission and signal processing method according to the present invention requires the same amount of feedback information and the same number of operations for bit allocation as those required in the conventional SBA scheme which minimizes the amounts of feedback information and number of operations, and also can significantly improve the bit error rate performance as compared with the conventional SBA scheme.

In addition, according to the ACBA of the present invention, since the soft demapper is associated in an interference cancellation procedure to perform a soft zigzag decoding, there is an advantage in that the gain of a channel code can be maximized.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for allocating bits to sub-channels for data transmission in a wireless communication system, the method comprising the steps of:
   (a) setting a number of bits allocated to all sub-channels to an initial value;
   (b) calculating a number of sub-channels required for bit allocation;
   (c) determining an encoding detection sequence for each subcarrier in a state in which the initial value is set;
   (d) calculating a weight vector for all subcarriers according to the encoding detection sequence;
   (e) determining a sub-channel with a least 2-Norm value from among all sub-channels by using the calculated weight vector;
   (f) selecting the sub-channel with the least 2-Norm value for bit allocation; and
   (g) allocating K bits to the selected sub-channel,
   wherein steps (e), (f) and (g) are repeated until a number of selected sub-channels for the bit allocation satisfies $D_{ACBA} = |R_b \times (R+\Delta R)^{-1}/K|$,
   where $D_{ACBA}$ represents a number of sub-channels to be allocated, $R_b$ represents a number of information bits to be transmitted, R represents a channel code rate applied in a system that does not employ a bit allocation algorithm, K represents a number of bits per symbol applied in the system that does not employ a bit allocation algorithm, and $\Delta R$ represents an increment of a channel code rate required to ensure a sub-channel for bit allocation.

2. The method as claimed in claim 1, wherein the selected sub-channel is excluded from a procedure for determining a sub-channel to which a next bit is allocated.

3. The method as claimed in claim 1, further comprising a step of performing an encoding detection by using a new set of weight vectors for a transmission antenna used for each subcarrier, after the step of allocating bits.

4. The method as claimed in claim 3, wherein the new set of weight vectors is a set of weight vectors for sub-channels except for an unused sub-channel when the unused sub-channel exists.

5. The method as claimed in claim 1, wherein transmission power for a sub-channel to which no bit has been allocated is zero.

6. The method as claimed in claim 1, wherein the bit allocation is performed based on delay time of feedback information when the bit allocation is actually applied to a system, and the delay time of feedback information is calculated by, $$DT_{Feedback} = T_{processing} + \frac{d}{v_L}$$

where $DT_{Feedback}$ represents delay time of feedback information, $T_{Processing}$ represents a sum of operation time periods required in a transmission side and a reception side, 'd' represents a distance between the transmission side and the reception side, and $V_L$ represents the flux of light.

7. An apparatus for allocating bits to sub-channels for data transmission in a wireless communication system, comprising: a bit allocation unit for repeatedly setting numbers of bits allocated to all sub-channels to an initial value, calculating a number of sub-channels required for bit allocation, determining an encoding detection sequence for each subcarrier in a state in which the initial value is set, calculating a weight vector for all subcarriers according to the determined encoding detection sequence, determining a sub-channel with a least 2-Norm value from among all the sub-channels by using the calculated weight vector, selecting the sub-channel with the least 2-Norm value for bit allocation, and allocating K bits to the selected sub-channels, until a number of selected sub-channels for the bit allocation satisfies $D_{ACBA} = |R_b \times (R+\Delta R)^{-1}/K|$, where $D_{ACBA}$ represents a number of sub-channels to be allocated, $R_b$ represents a number of information bits to be transmitted, R represents a channel code rate applied in a system that does not employ a bit allocation algorithm, K represents a number of bits per symbol applied in the system that does not employ the bit allocation algorithm, and $\Delta R$ represents an increment of a channel code rate required for a sub-channel for bit allocation.

8. The apparatus as claimed in claim 7, wherein the selected sub-channel is excluded when determining a sub-channel to which a next bit is allocated.

9. The apparatus as claimed in claim 7, wherein an encoding detection is further performed using a new set of weight vectors for a transmission antenna used for each subcarrier after the bit allocation has been performed.

10. The apparatus as claimed in claim 9, wherein the new set of weight vectors is a set of weight vectors for sub-channels except for an unused sub-channel when the unused sub-channel exists.

11. The apparatus as claimed in claim 7, wherein transmission power for a sub-channel to which no bit has been allocated is zero.

12. The apparatus as claimed in claim 7, wherein the bit allocation is performed based on delay time of feedback information when the bit allocation is actually applied to a system, and the delay time of feedback information is calculated by, $$DT_{Feedback} = T_{processing} + \frac{d}{v_L}$$

where $DT_{Feedback}$ represents delay time of feedback information, $T_{Processing}$ represents a sum of operation time periods required in a transmission side and a reception side, d represents a distance between the transmission side and the reception side, and $V_L$ represents the flux of light.

* * * * *